US010981065B2

(12) United States Patent
Oshino et al.

(10) Patent No.: US 10,981,065 B2
(45) Date of Patent: Apr. 20, 2021

(54) STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Yosuke Oshino, Kyoto (JP); Fumiya Nakano, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 83 days.

(21) Appl. No.: 16/366,076

(22) Filed: Mar. 27, 2019

(65) Prior Publication Data

US 2019/0299099 A1 Oct. 3, 2019

(30) Foreign Application Priority Data

Mar. 28, 2018 (JP) .............................. JP2018-062338
Dec. 20, 2018 (JP) .............................. JP2018-238412

(51) Int. Cl.
*A63F 13/63* (2014.01)
*A63F 13/55* (2014.01)
*A63F 13/46* (2014.01)
*A63F 13/49* (2014.01)

(52) U.S. Cl.
CPC .............. *A63F 13/63* (2014.09); *A63F 13/46* (2014.09); *A63F 13/55* (2014.09); *A63F 13/49* (2014.09)

(58) Field of Classification Search
CPC .......... A63F 13/46; A63F 13/49; A63F 13/55; A63F 13/63; A63F 13/92
See application file for complete search history.

(56) References Cited

U.S. PATENT DOCUMENTS

| 6,961,055 | B2 * | 11/2005 | Doak ....................... | G06T 19/00 345/419 |
|---|---|---|---|---|
| 9,662,565 | B1 * | 5/2017 | Riordan .................. | A63F 13/80 |
| 9,814,983 | B2 * | 11/2017 | Johnston ................. | A63F 13/10 |
| 10,688,395 | B2 * | 6/2020 | Oshino .................... | A63F 13/63 |
| 10,828,563 | B2 * | 11/2020 | Matsushita ............. | A63F 13/46 |
| 2002/0078376 | A1 * | 6/2002 | Miyoshi .................. | A63F 13/12 726/26 |

(Continued)

OTHER PUBLICATIONS

"Wario Ware D.I.Y.: Game creator's ultra handbook", Shogakukan Inc., first edition, Jul. 1, 2009, p. 48 w/ EnglishTranslation, 5 pages.

(Continued)

*Primary Examiner* — William H McCulloch, Jr.
(74) *Attorney, Agent, or Firm* — Nixon & Vanderhye PC

(57) ABSTRACT

An example of an information processing apparatus places an object in a virtual space. The information processing apparatus counts, for at least one type of the object, a placement number of the objects placed in the virtual space. The information processing apparatus presents candidates of a clear condition including a condition relating to the object, on the basis of the counted placement number, in a selectable manner for a user. The clear condition is used for determining that a game using the virtual space has been cleared. The information processing apparatus sets a candidate selected by the user, as the clear condition.

29 Claims, 24 Drawing Sheets

(56) References Cited

U.S. PATENT DOCUMENTS

| | | | | |
|---|---|---|---|---|
| 2012/0169593 A1* | 7/2012 | Mak | ................. | G06F 3/0485 |
| | | | | 345/157 |
| 2013/0281185 A1* | 10/2013 | Masuda | ................. | A63F 13/10 |
| | | | | 463/23 |
| 2019/0282905 A1* | 9/2019 | Oshino | ................. | A63F 13/63 |
| 2019/0299099 A1* | 10/2019 | Oshino | ................. | A63F 13/63 |

OTHER PUBLICATIONS

Far Cry 4, Weekly Famitsu, KADOKAWA Co., Ltd., Jan. 8, 2015, vol. 30, No. 4, pp. 52-55.

Famitsu DS Plus Wii November issue special appendix, Super Mario Maker cheat sheet, KADOKAWA Co., Ltd. DWANGO, Sep. 18, 2015, vol. 17, No. 11, pp. 3-4, 12, 17, 21, 22.

New Super Mario Bros. Wii Action Masters Book, Nintendo DREAM January issue separate volume appendix, Mainichi Communications Co., Ltd., Nov. 26, 2009, vol. 15, No. 1, pp. 4,6-7,10,14-19.

Search for a ghost ship ★From Grinrad to the sea near Romaria! Explore the inside of the ghost ship★, Playing the DS version of Dragon Quest 3 vol. 33 [online], Feb. 15, 2018, [searched on Dec. 25, 2020]. URL, https://www.tsapps.net/dq/dq3/dq3-diary-vol33.

Notice of Reasons for Refusal dated Jan. 7, 2021 for Japanese Patent Application No. 2018-238412 with English machine translation, 13 pages.

\* cited by examiner

STORAGE MEDIUM HAVING STORED
THEREIN INFORMATION PROCESSING
PROGRAM, INFORMATION PROCESSING
APPARATUS, INFORMATION PROCESSING
SYSTEM, AND INFORMATION
PROCESSING METHOD

CROSS REFERENCE TO RELATED
APPLICATION

The disclosures of Japanese Patent Applications No. 2018-62338, filed on Mar. 28, 2018, and No. 2018-238412, filed on Dec. 20, 2018, are incorporated herein by reference.

FIELD

The technique shown here relates to a storage medium having stored therein an information processing program, an information processing apparatus, an information processing system, and an information processing method which are capable of setting a game clear condition.

BACKGROUND AND SUMMARY

Conventionally, a game program, which allows a user to set a game clear condition (also referred to as "success condition"), has been known. For example, the conventional game program allows the user to place objects in a game space, and set, as a clear condition, a state to be achieved by each of the placed objects.

With such a conventional game program, since the user sets, for each object, the state to be achieved as the clear condition, the operation of setting the clear condition may become complicated for the user.

Therefore, the present application discloses a storage medium having stored therein an information processing program, an information processing apparatus, an information processing system, and an information processing method which allow a user to easily set a clear condition.

(1) An example of a non-transitory computer readable storage medium described in this specification has stores therein an information processing program to be executed by a computer processor of an information processing apparatus. The information processing program causes the computer processor to function as object placement means, count means, candidate presentation means, and clear condition setting means. The object placement means places an object in a virtual space. The count means counts, for at least one type of the object, a placement number of the objects placed in the virtual space. The candidate presentation means presents, to a user, candidates of a clear condition including a condition relating to the object, on the basis of the counted placement number, in a selectable manner for the user. The clear condition is used for determining that a game using the virtual space has been cleared. The clear condition setting means sets a candidate selected by the user, as the clear condition.

According to the configuration of the above (1), since the candidates according to the number of the objects placed in the virtual space are presented to the user, the user can easily perform the operation of selecting a candidate, and therefore can easily set the clear condition.

(2) The candidate presentation means may present, as each of the candidates, a condition relating to a parameter indicating: the number of game events to be caused by an action that is based on an input of a player of the game and is executed on the at least one type of object; or an amount corresponding to the game events.

According to the configuration of the above (2), the user can easily set the clear condition relating to the number of game events caused by the action executed on the object, or the amount corresponding to the game events.

(3) The parameter may change for each object.

According to the configuration of the above (3), even when game events are generated with respect to a plurality of objects by a single action, the clear condition can be accurately determined.

(4) The clear condition may be a condition that the value of the parameter coincides with a condition value. The candidate presentation means may present, as the candidates, a plurality of conditions having different condition values within a range from equal to or greater than a predetermined value to equal to or smaller than the placement number.

According to the configuration of the above (4), the range of the condition value in the clear condition can be determined based on the placement number, and presented.

(5) The clear condition may be a condition that the value of the parameter is a value within a predetermined range in which an upper-limit value and/or a lower-limit value is set as a boundary value. The candidate presentation means may present, as the candidates, a plurality of conditions having different boundary values of the predetermined range, within a range from equal to or greater than a predetermined value to equal to or smaller than the placement number.

According to the configuration of the above (5), the range of the boundary value in the clear condition can be determined, based on the placement number, and presented.

(6) The candidate presentation means may present the candidates in such a manner that allows the user to select, independently from each other, the type of the object relating to the clear condition, and a condition value relating to the parameter. The candidate presentation means may cause a candidate group consisting of a plurality of the candidates having different condition values to change according to the type of the object selected by the user.

According to the configuration of the above (6), the user can select the type of object and the condition value in the clear condition independently from each other, and therefore can easily perform the operation of selecting a candidate of the clear condition. In addition, the candidate group is changed according to the type of object in the clear condition, which also allows the user to easily perform the operation of selecting a candidate of the clear condition.

(7) The clear condition may include a condition value relating to the parameter. The candidate presentation means may present, as an initial candidate that is firstly presented among the candidates, the condition value that is equal to the placement number.

According to the configuration of the above (7), the operation of the user for selecting a desired candidate can be simplified.

(8) The clear condition may include a condition value relating to the parameter. In a case where the placement number is changed after the clear condition in which the value of the parameter is equal to the placement number has been set, the clear condition setting means may reset the clear condition to a clear condition in which the condition value is equal to the changed placement number.

According to the configuration of the above (8), since the condition value in the already set clear condition is changed according to a change in the number of the placed objects, the user is saved the trouble of resetting the clear condition.

(9) The object placement means may be able to place, in the virtual space, a specific object that causes the object to appear in the virtual space during game play. The count means may correct the counted placement number in accordance with the number of the specific objects placed in the virtual space.

According to the configuration of the above (9), the placement number can be counted more accurately, while taking into account objects that are not directly placed in the virtual space.

(10) The number of the game events may be the number of enemy objects that have been defeated according to an action for defeating the object that is an enemy object.

(11) The number of the game events may be the number of item objects that have been collected according to an action for collecting the object that is an item object.

(12) The at least one type of the object may act on a player object, in the virtual space, which is operated by the player, to change the state of the player object. The candidate presentation means may present, as the candidates, conditions relating to the state of the player object.

According to the configuration of the above (12), the user can easily set the clear condition relating to the state of the player object.

(13) The information processing program may further cause the computer processor to function as game execution means. The game execution means executes game processing in which the player is allowed to play the game in the virtual space, by using the set clear condition which is a necessary condition.

According to the configuration of the above (13), the information processing apparatus can determine whether or not the game has been cleared, while taking into account another condition in addition to the clear condition. Thus, the condition for determining that the game has been cleared can be made complicated, thereby enhancing the interest of the game.

(14) The game execution means may determine that the game has been cleared, in response to the player object, which is operated by the player, reaching a predetermined goal position in the virtual space, with the clear condition having been satisfied.

According to the configuration of the above (14), the condition for determining that the game has been cleared is made complicated, thereby enhancing the interest of the game.

(15) When the clear condition has been satisfied during game play using the virtual space, the game execution means may notify the player that the clear condition has been satisfied.

According to the configuration of the above (15), since the player, who is playing the game, can recognize whether or not the clear condition has been satisfied, the convenience of the player can be improved.

(16) The game execution means may display an image indicating that the clear condition has been satisfied, in association with the position of the player object operated by the player.

According to the configuration of the above (16), whether or not the clear condition has been satisfied can be notified to the player in an easy-to-understand manner.

(17) The game execution means may execute the game processing, based on instructions made by a plurality of players.

According to the configuration of the above (17), setting of a clear condition in a multiplayer game can be facilitated.

(18) The game execution means may determine that the game has been cleared, in response to the player object, which has satisfied the clear condition, reaching a predetermined goal position in the virtual space, among a plurality of player objects operated by the plurality of players in the game processing.

According to the configuration of the above (18), it is possible to provide the highly entertaining game which is cleared when, among a plurality of player objects, a player object that has satisfied a clear condition reaches a goal.

(19) The game execution means may allow some of the plurality of player objects to enter the state where the clear condition has been satisfied, with the number of the player objects less than the number of the plurality of player objects being an upper limit. At this time, the game execution means may display the player objects that has satisfied the clear condition, in a manner distinguishable from the state where the clear condition is not satisfied.

According to the configuration of the above (19), it is possible to notify each player of the fact that the clear condition has been satisfied, and the player object that has satisfied the clear condition.

(20) When a first player object that does not satisfy the clear condition performs a predetermined action on a second player object that has satisfied the clear condition, the game execution means may change the first player object into the state where the clear condition has been satisfied.

(21) When the player object, which satisfied the clear condition, has satisfied a cancellation condition, the game execution means may cause a predetermined clear object to appear in the virtual space. At this time, when the player object, which does not satisfy the clear condition, obtains the clear object, the game execution means may change the player object into the state where the clear condition has been satisfied.

According to the configuration of the above (20) or (21), even after a certain player object has satisfied the clear condition, another player object has a chance to obtain the right to reach the goal. This causes a situation that a player object that will clear the game is not determined until the very end, which can enhance the interest of the game.

(22) The game execution means may causes a display device to display an image indicating a range of a part, of the virtual space, including an own player object operated by a player who performs an input to the information processing apparatus. At this time, in a case where, among the plurality of player objects, another player object different from the own player object has satisfied the clear condition and is present outside the range displayed in the display device, the game execution means may cause the display device to display an image indicating the position and/or the direction of the another player object.

According to the configuration of the above (22), even when player object that has satisfied the clear condition is not present in the display range, the position and/or the direction of the player object can be notified to each player.

(23) The clear condition may be a condition relating to a parameter that indicates: the number of game events caused by an action that is based on an input of a player of the game and is executed on the at least one type of the object; or an amount corresponding to the game events. The parameter may indicate a total of the numbers of the game events or the amounts corresponding to the game events with respect to the plurality of player objects. The game execution means may cause a player object, which has performed the action that causes the parameter to satisfy the clear condition, to be in the state where the clear condition has been satisfied. At this time, the game execution means may present the number or the amount required for satisfying the clear condition, and may not present the current value of the parameter.

According to the configuration of the above (23), each player is prevented from performing the game by an unfair playing method that degrades the interest of the game.

This specification discloses examples of an information processing apparatus and an information processing system including the respective means described in the above (1) to (23). In addition, this specification discloses an example of an information processing method to be executed in the information processing apparatus (or the information processing system) in the above (1) to (23).

According to the storage medium having stored therein the information processing program, the information processing apparatus, the information processing system, and the information processing method, setting of a clear condition can be easily performed.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
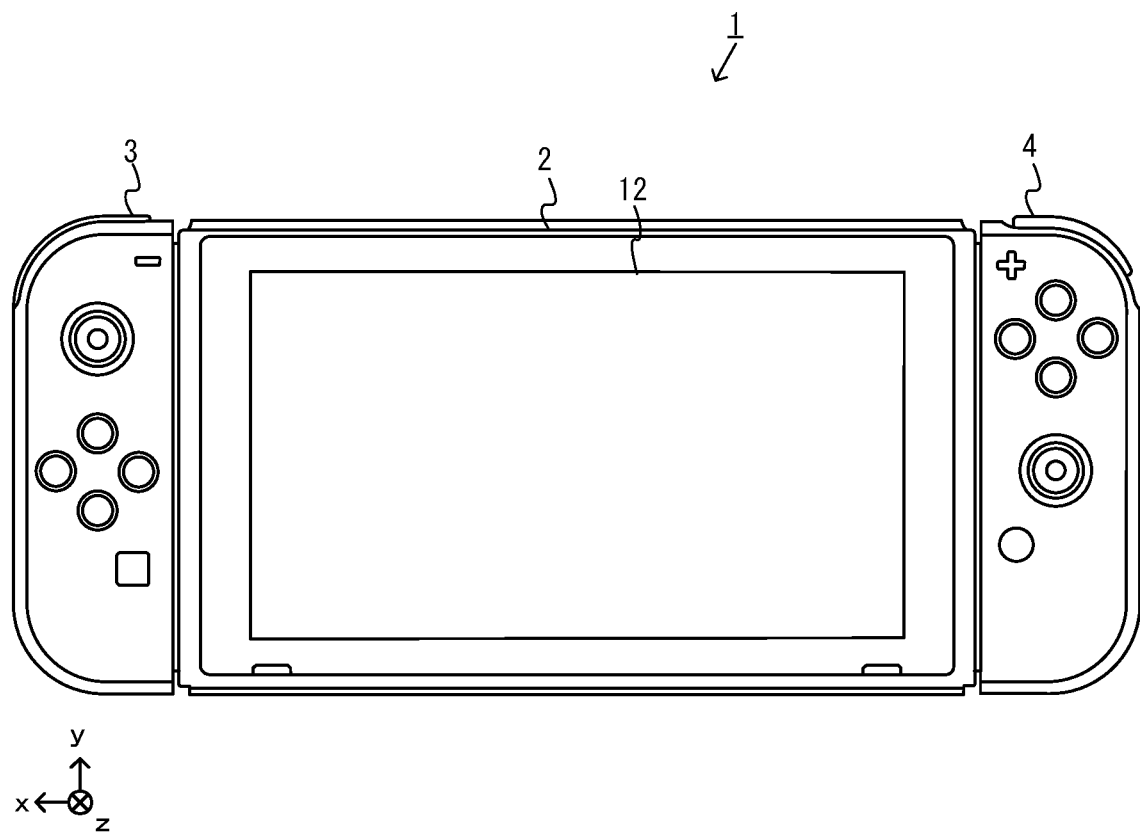
FIG. 1 is a diagram showing an example of a state where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
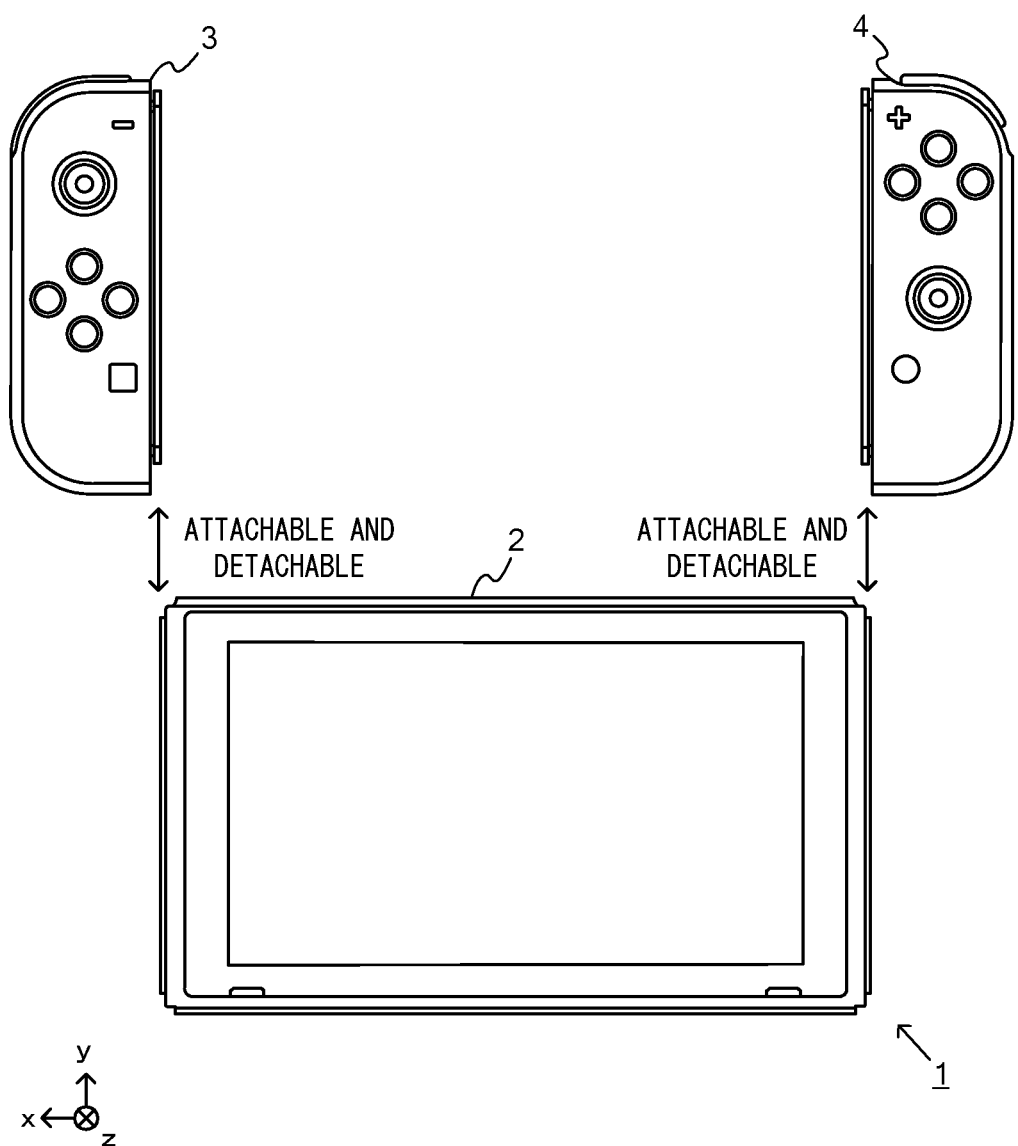
FIG. 2 is a diagram showing an example of a state where each of the non-limiting left controller and the non-limiting right controller is detached from the non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
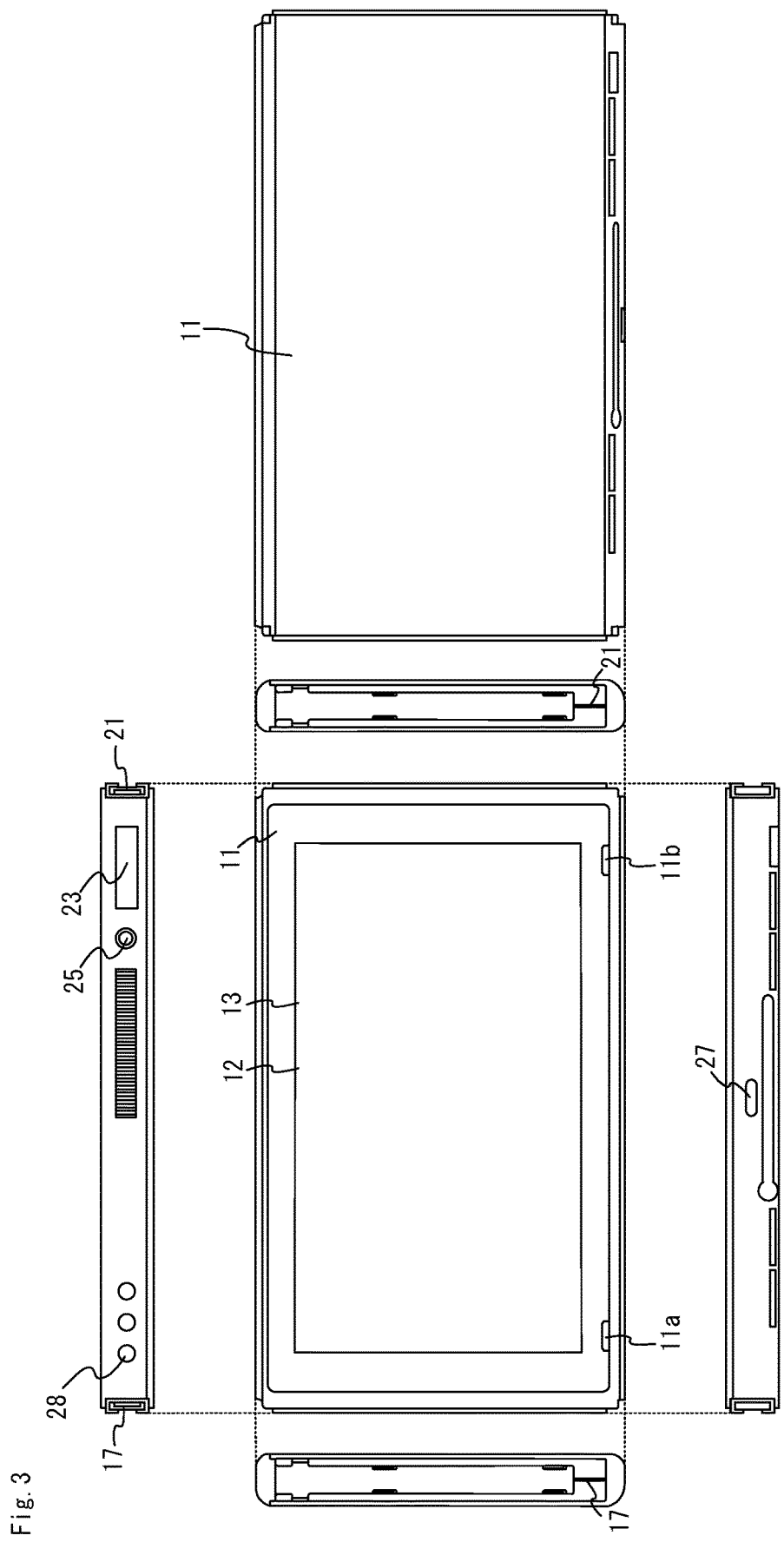
FIG. 3 is six orthogonal views showing an example of the non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
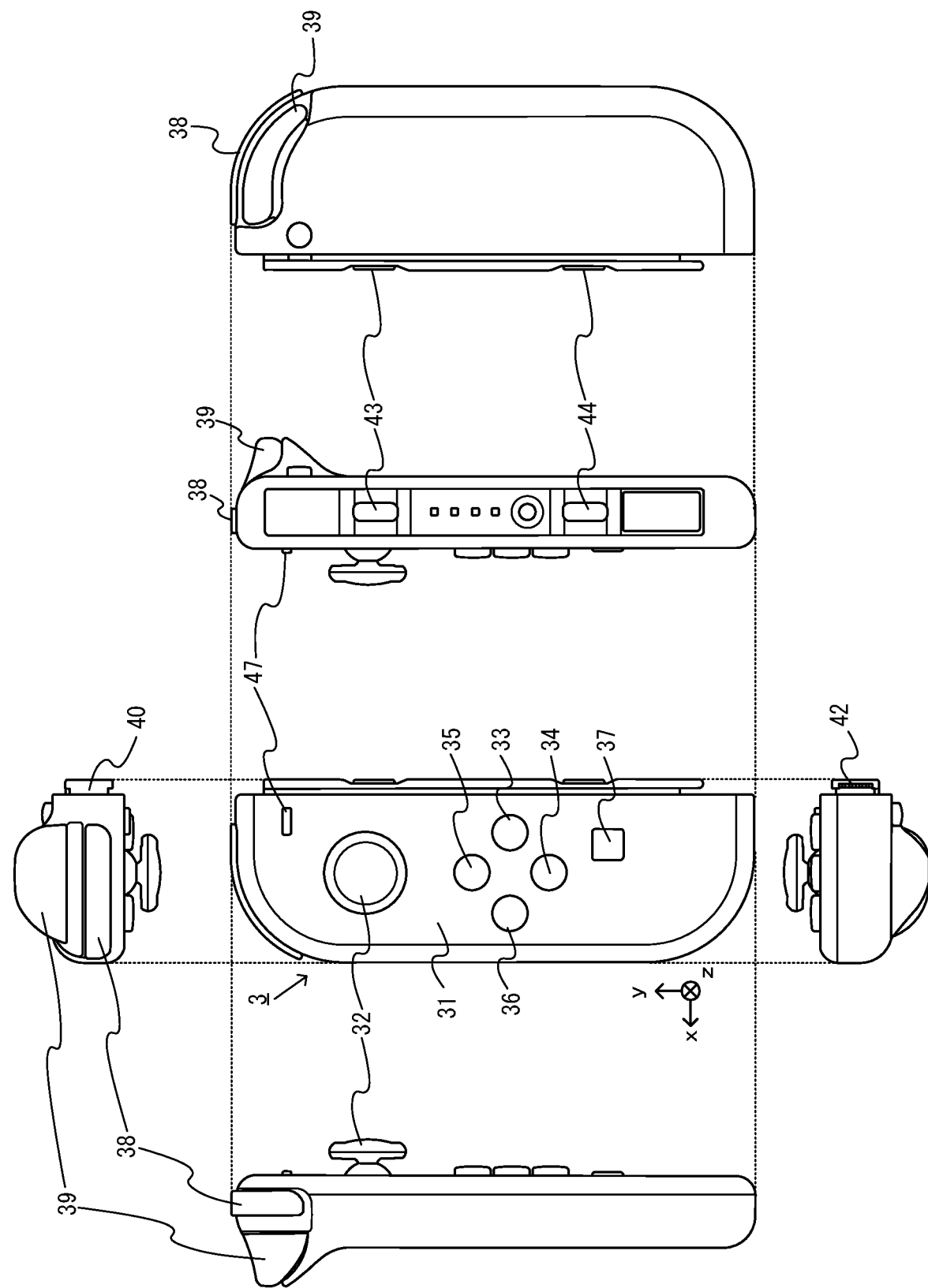
FIG. 4 is six orthogonal views showing an example of the non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
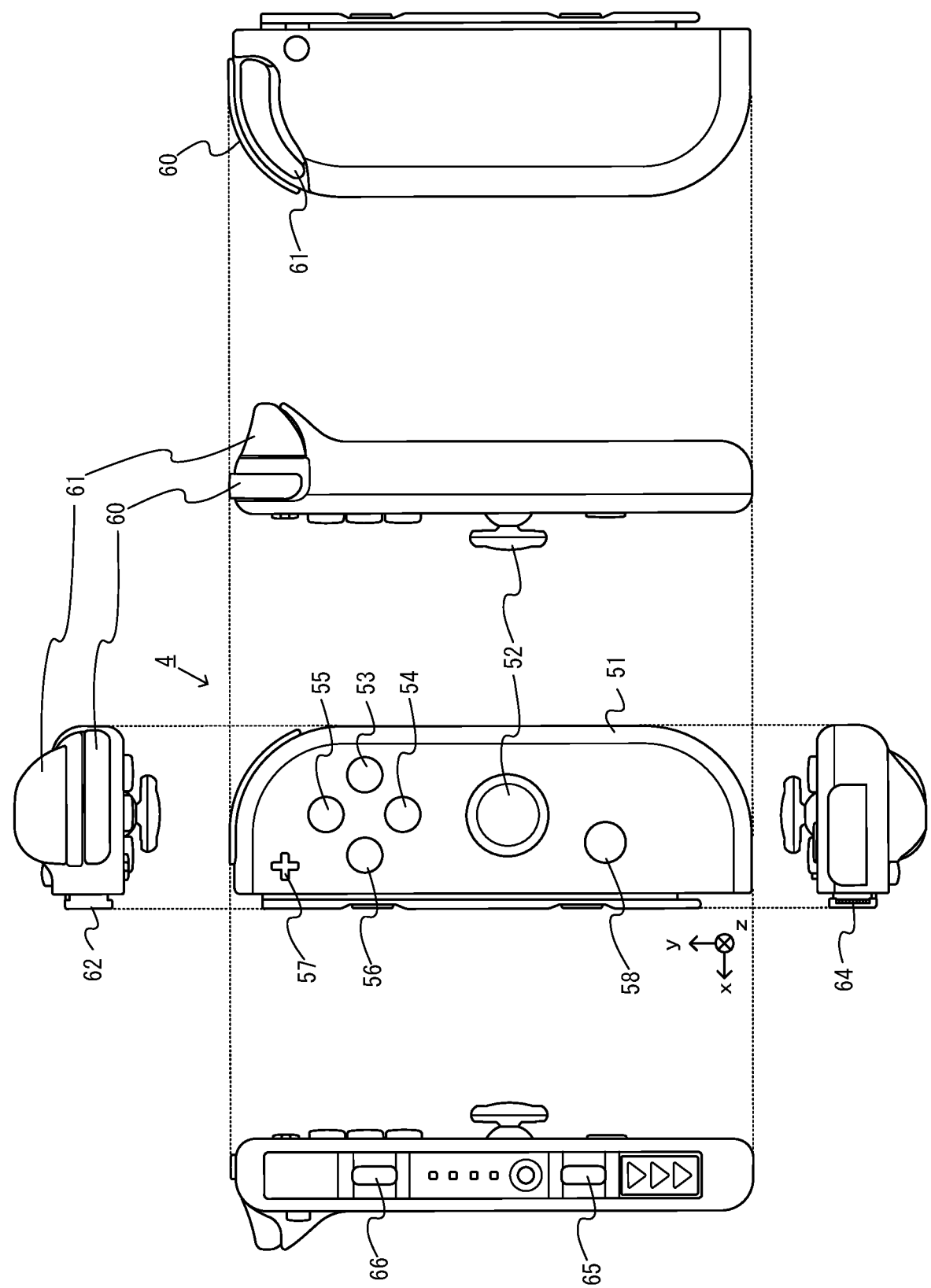
FIG. 5 is six orthogonal views showing an example of the non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
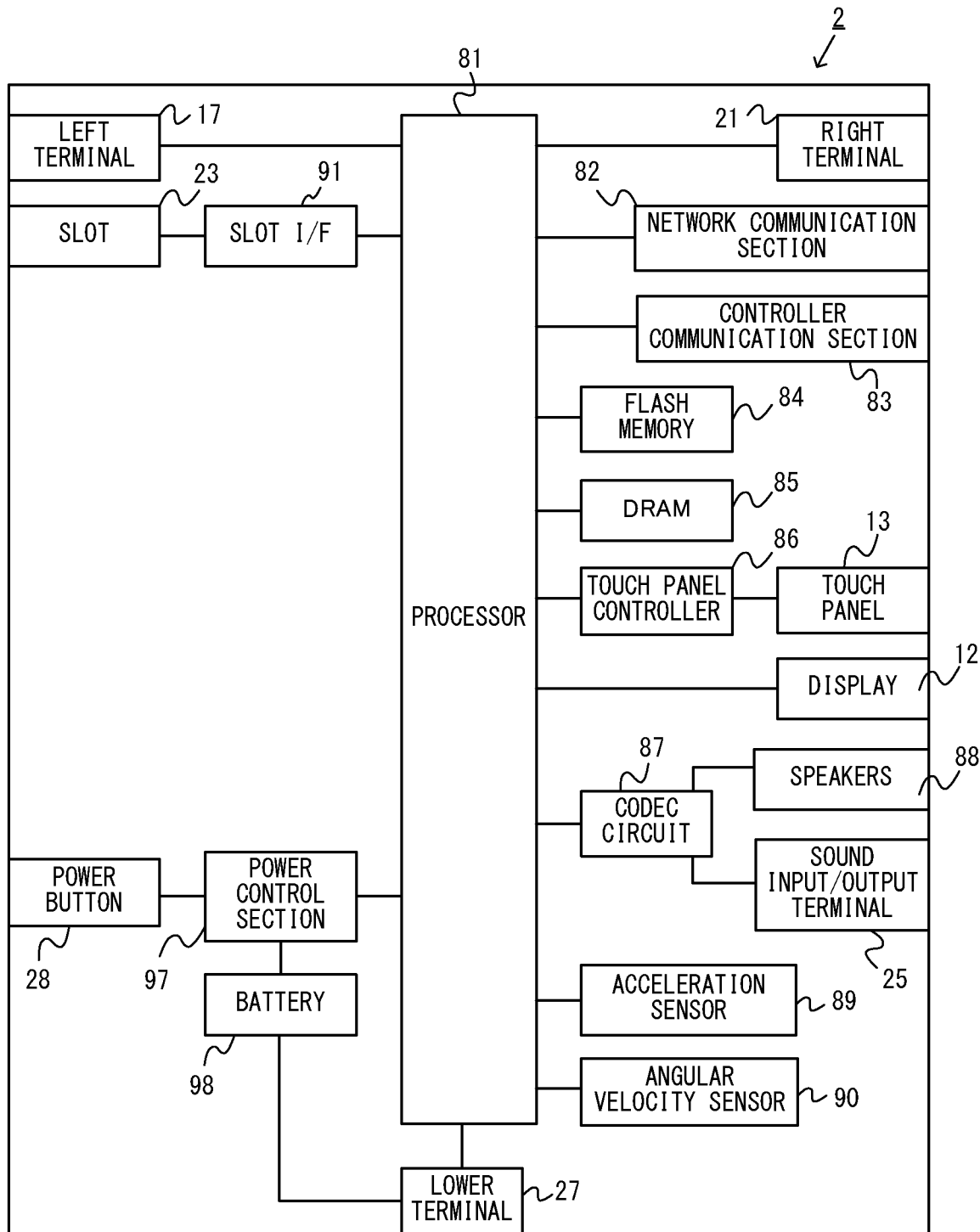
FIG. 6 is a block diagram showing an example of the internal configuration of the non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information relating to the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
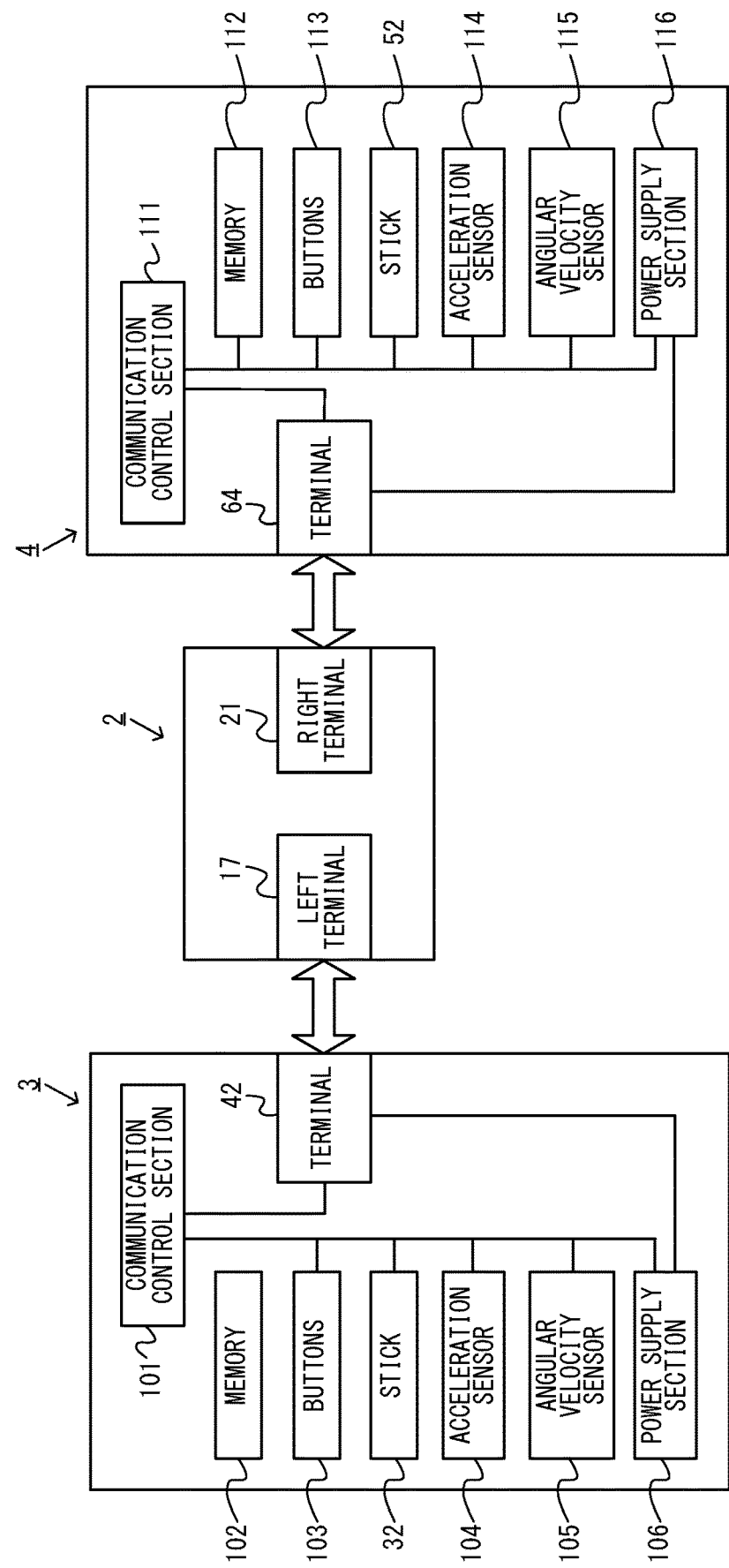
FIG. 7 is a block diagram showing examples of the internal configurations of the non-limiting main body apparatus, the non-limiting left controller, and the non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information relating to an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information relating to an input (specifically, information relating to an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information relating to an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information relating to the motion and/or the orientation of the left controller 3 based on the operation data (specifically, the detection results of the acceleration sensor 104 and the angular velocity sensor 105).

The left controller 3 includes a power supply section 106. In the exemplary embodiment, the power supply section 106 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 116. The power supply section 116 has a function similar to that of the power supply section 106 of the left controller 3 and operates similarly to the power supply section 106.

[2. Outline of Processing in Game System]

[2-1. Outline of Game and Game Processing]

Hereinafter, an outline of information processing executed by the game system 1 according to the exemplary embodiment will be described with reference to FIG. 8. In the exemplary embodiment, the game system 1 executes a game program for a game in which a user creates a game space (in other words, a game stage), and plays by using the created game space. That is, this game has: a creation mode in which the user creates a game space; and a play mode in which the user (in other words, a player) plays by using the game space. In the creation mode, the user creates a game space by placing objects in the game space. In the play mode, the player controls a player object, which appears in the game space, to achieve a purpose in the game (in the exemplary embodiment, to reach a goal by satisfying a clear condition described below). In the exemplary embodiment, a person who creates a game space in the creation mode is called a "user", and a person who plays the game in the play mode is called a "player". The user and the player may be the same person or different persons.

Figure 8:
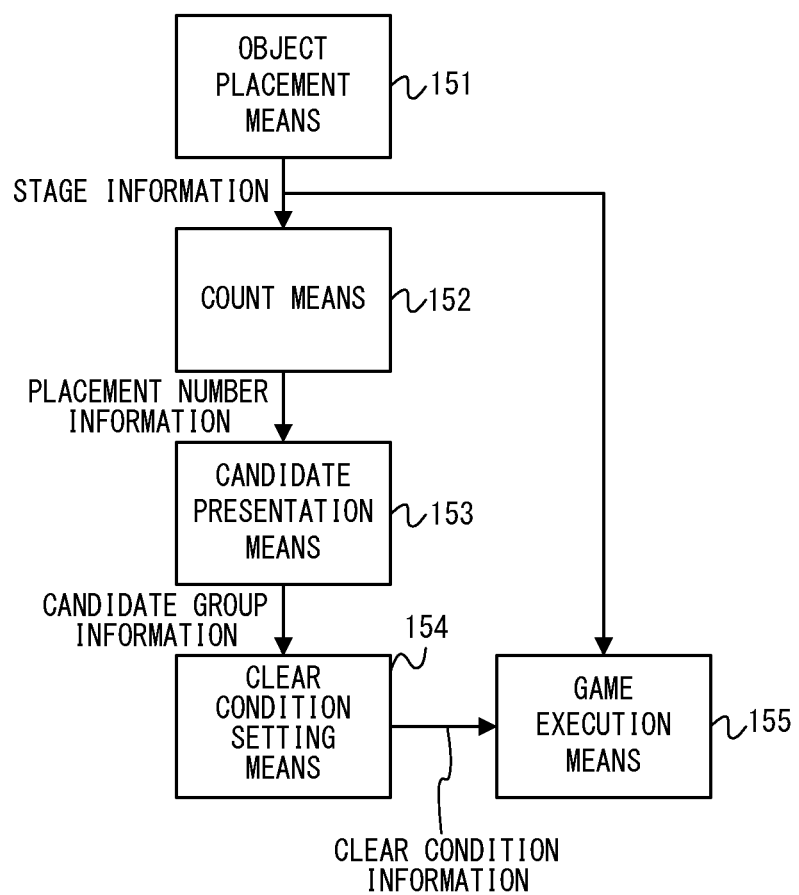
FIG. 8 is a functional block diagram showing an example of a functional configuration of a non-limiting game system.

FIG. 8 is a functional block diagram showing an example of a functional configuration of the game system 1. In the exemplary embodiment, the game system 1 includes object placement means 151, count means 152, candidate presentation means 153, clear condition setting means 154, and game execution means 155. In the exemplary embodiment, the means 151 to 155 are implemented by the processor 81 of the main body apparatus 2. Specifically, the means 151 to 155 are implemented when the processor 81 executes an information processing program (specifically, a game program) stored in a storage medium that is accessible to the processor 81. The "storage medium that is accessible to the processor 81" may be, for example, the flash memory 84, or a storage medium attached to the slot 23.

The object placement means 151 places objects in the game space. In the exemplary embodiment, in the creation mode, objects are placed based on an instruction of the user. However, in another embodiment, the object placement means 151 may place objects not based on an instruction of the user but on any algorithm. In the exemplary embodiment, examples of the objects placed in the game space include: a terrain object (a block object or a pipe object described below); a player object; an enemy object; and an item object. In the exemplary embodiment, the object placement means 151 receives input information indicating an instruction of the user, and creates a game space in which the objects are placed, based on the instruction. In addition, the object placement means 151 outputs stage information indicating the created game space. In the exemplary embodiment, the stage information includes information relating to the objects placed in the game space (e.g., information indicating the type, position, shape, and direction of each object).

As for a predetermined type of objects, the count means 152 counts the number of the objects placed in the game space. Hereinafter, the number counted by the count means 152 is referred to as "placement number". In the exemplary embodiment, objects, whose placement number is counted, are objects relating to a clear condition described below, and specifically are enemy objects and/or item objects.

The count means 152 counts the placement number of a predetermined type of objects, for each type of objects. In the exemplary embodiment, as for different types of enemy objects (e.g., a first enemy object and a second enemy object described below), the count means 152 counts the placement numbers thereof separately from each other. In addition, as for different types of item objects (e.g., a coin object and a flower object), the count means 152 counts the placement numbers thereof separately from each other. However, in another embodiment, the count means 152 may regard all the enemy objects as a type of objects, and may count the placement number with respect to the enemy objects. In addition, the count means 152 may regard all the item objects as a type of objects, and may count the placement number with respect to the item objects. For example, the count means 152 may regard a plurality of types of objects as a type of objects. Specifically, when a red turtle as an enemy object and a green turtle as another enemy object are placed in the game space, these enemy objects, i.e., the red and green turtles, may be regarded as a type of enemy objects that are turtles. Thus, the criterion with which the types of objects are separated is optional.

The count means 152 counts the placement number of a predetermined type of objects, based on the stage information, and outputs placement number information indicating the placement number. For example, the placement number information includes information in which the type of objects is associated with the placement number of the type of objects.

The candidate presentation means 153 presents candidates of a clear condition to the user. In the exemplary embodiment, in the creation mode, a clear condition can be set for the game space (in other words, the stage) created by the user. The clear condition is a condition for clearing the created stage. Although the details will be described below, examples of the clear condition include: "three or more first enemy objects should be defeated"; "five or more coins should be collected"; and "the player object should enter a special state (by obtaining an item)". In the exemplary embodiment, when a player object has reached a goal (i.e., a goal position set in the game space) with the clear condition having been satisfied, the stage on which the clear condition is set is regarded as being cleared.

The content of the clear condition is optional, and is not limited to a condition relating to an enemy object or an item object. For example, in another embodiment, the clear condition may be a condition relating to a terrain object. Specifically, the clear condition may be that "the player object should ride on five platform objects" or that "the player object should collide with obstacle object(s) three times". Alternatively, the clear condition may be a condition relating to a vehicle object on which the player object can ride. For example, the clear condition may be that "the player object should reach the goal while riding on the vehicle object".

In the exemplary embodiment, the candidate presentation means 153 determines candidates of the clear condition to be presented to the user, based on the placement number. For example, when three first enemy objects are placed in the stage, the candidate presentation means 153 presents, as for a clear condition that "n (n: natural number) first enemy objects should be defeated", three candidates taking n=1 to 3, respectively. Alternatively, for example, when six first enemy objects are placed in the stage, the candidate presentation means 153 presents, as for a clear condition that "n first enemy objects should be defeated", six candidates taking n=1 to 6, respectively. Thus, the candidate presentation means 153 presents, to the user, the candidates whose number depends on the placement number. Although the details will be described below, the candidate presentation means 153 presents the determined candidates to the user in a selectable manner for the user.

In the exemplary embodiment, the candidate presentation means 153 determines the candidates to be presented, based on the placement number information. In addition, the candidate presentation means 153 outputs candidate group information indicating a candidate group consisting of one or more candidates that have been determined.

The clear condition setting means 154 sets a candidate, which has been selected by the user from among the candidates presented by the candidate presentation means 153, as a clear condition relating to the stage (i.e., the stage being created in the creation mode). The clear condition setting means 154 receives a user input that selects one of the candidates of the clear condition indicated by the candidate group information, and outputs clear condition information indicating the clear condition selected by the user.

The game execution means 155 executes, in the play mode, game processing that allows the player to play a game using the game space (in other words, the stage) created in the creation mode. In the exemplary embodiment, the game execution means 155 executes the game processing by using the game space indicated by the stage information, and the clear condition indicated by the clear condition information. Specifically, in the game processing, the game execution means 155 executes, for example, a process of controlling the motion of each object placed, and a process of determining whether or not the player object has reached the goal while satisfying the clear condition, in the created game space. In addition, the game execution means 155 causes the display device to display a game image representing the result of execution of the game processing. The display device on which the game image is displayed may be the display 12 of the main body apparatus 2, or the stationary monitor connected to the cradle.

As described above, in the exemplary embodiment, when setting a clear condition for the game space created by the user, the game system 1 presents candidates of the clear condition according to the placement number of the objects placed in the game space. Thus, the game system 1 presents different candidates according to the creation state of the game space, thereby facilitating the work of the user to set the clear condition (e.g., the work to select one of the candidates).

[2-2. Process of Creating Game Space]

Figure 9:
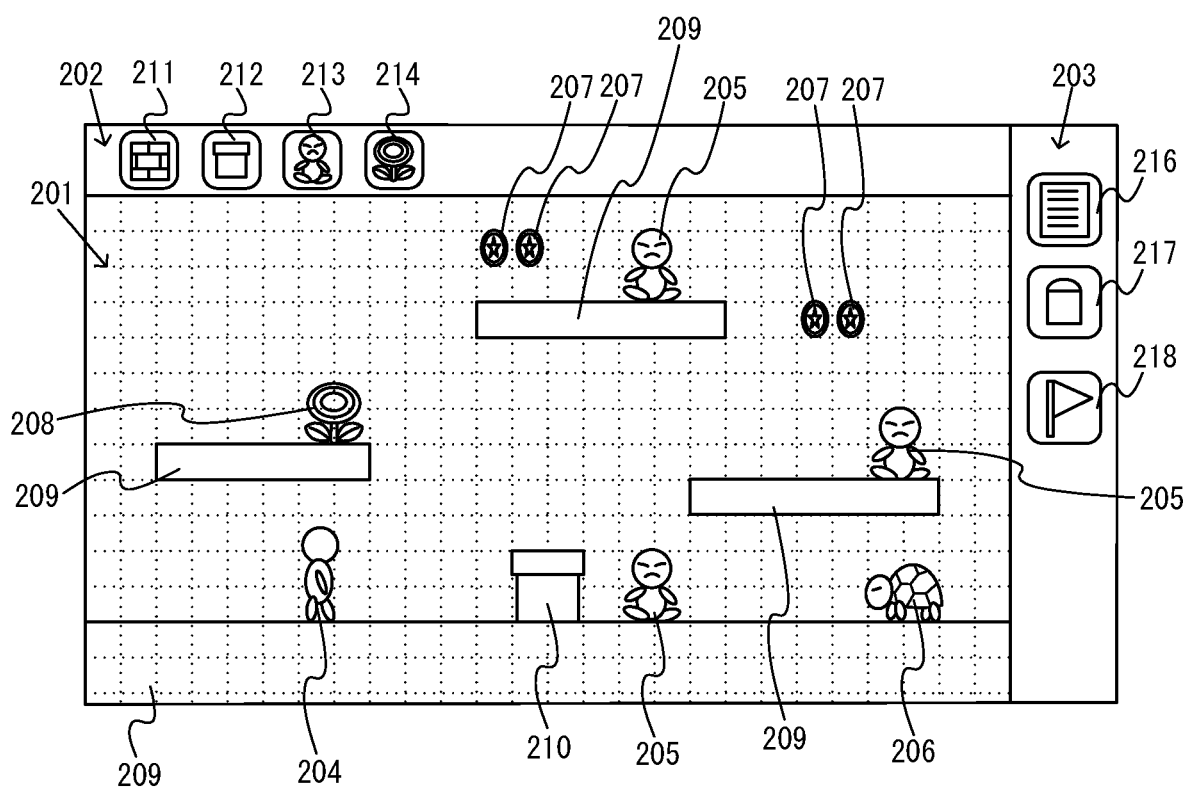
FIG. 9 shows an example of a game image displayed in a creation mode.

An outline of a process of creating a game space in the creation mode will be described with reference to FIG. 9. FIG. 9 shows an example of a game image displayed in the creation mode. As shown in FIG. 9, the game image in the creation mode includes a game space image 201 representing a game space.

As shown in FIG. 9, in the exemplary embodiment, various types of objects 204 to 210 are placed in the game space. A player object 204 is an object operated by the player. A first enemy object 205 and a second enemy object 206 are examples of enemy objects. The motion of each enemy object is controlled according to an algorithm predetermined in the game program. In the exemplary embodiment, when the player object 204 touches an enemy object, the game is over. When the player object 204 stomps on an enemy object or when the player object 204 causes a fireball to hit an enemy object, the player object 204 can defeat the enemy object. In the play mode, the game is started with the player object 204 and the enemy objects being placed in the positions where they have been placed in the creation mode.

A coin object 207 and a flower object 208 are examples of item objects. During the game play in the play mode, when the player object 204 obtains the coin object 207, a point is added to the score. Meanwhile, during the game play, when the player object 204 obtains the flower object 208, the player object 204 becomes able to throw a fireball (hereinafter, this state is referred to as "strengthened state"). In the exemplary embodiment, the player object 204 can enter a plurality of types of states including a normal state (i.e., a non-strengthened state) and the strengthened state. For example, by obtaining an item object, the player object 204 may be increased in size, or may become invincible (specifically, the invincible player object 204, even when touching an enemy object, does not cause game over and can defeat the enemy object). In another embodiment, the player object 204 may enter many types of states or one type of state.

A block object 209 and a pipe object 210 are examples of terrain objects. In the creation mode, the user can set a terrain of the game space by placing the block object 209 and/or the pipe object 210 in the game space. Although the details will be described below, in the exemplary embodiment, the user can create a game space such that an enemy object appears from the pipe object 210.

In the exemplary embodiment, the game space in which objects can be placed is larger than the screen of the display device. In the creation mode, the user can change the display range of the game space by performing an instruction to scroll the display range.

As shown in FIG. 9, the game image in the creation mode includes an object bar image 202. The object bar image 202 is used for designating an object to be placed in the game space. Specifically, the object bar image 202 includes icons 211 to 214 each allowing a placement instruction to place an object that can be placed in the game space. A block icon 211 is an icon that allows a placement instruction to place a block object 209. A pipe icon 212 is an icon that allows a placement instruction to place a pipe object 210. An enemy icon 213 is an icon that allows a placement instruction to place an enemy object. An item icon 214 is an icon that allows a placement instruction to place an item object. In the exemplary embodiment, in the creation mode, the player object 204 has been placed in the game space in advance. The object placement means 151 changes the position of the player object 204 in the game space, based on an instruction of the user.

In the exemplary embodiment, in the creation mode, the user performs an instruction to select one of the icons 211 to 214 (e.g., an instruction made by touching the icon), and thereafter performs a placement instruction to designate a position in the game space on the screen (e.g., an instruction made by touching the position), whereby the user can place an object corresponding to the designated icon in the game space. The operation of instructing placement of an object in the game space is optional, and an object may be placed through any operation.

In the exemplary embodiment, the user can change the content of each displayed icon by performing a switching instruction. For example, according to the switching instruction of the user, the game system 1 switches the enemy icon 213 between an image representing the first enemy object 205 and an image representing the second enemy object 206. The user causes the enemy icon 213, which represents his/her desired enemy object, i.e., the first enemy object 205 or the second enemy object 206, to be displayed, and thereafter performs an instruction to designate the enemy icon 213, thereby placing the desired enemy object in the game space.

In the exemplary embodiment, as shown in FIG. 9, a grid is set in the game space during the creation mode, and grid lines (dotted lines shown in FIG. 9) are displayed. In the exemplary embodiment, the object placement means 151 places objects along the grid. Thus, when the user places an object in the game space, the user can easily designate the position of the object.

As shown in FIG. 9, the game image in the creation mode includes a menu bar image 203 used for performing various instructions in the creation mode. In the exemplary embodiment, the menu bar image 203 includes a menu icon 216, a deletion icon 217, and a clear condition icon 218.

The menu icon 216 is an icon that allows an instruction to display a menu image. Although not shown in FIG. 9, the menu image includes, for example, icons that allow, for example, an instruction to store a created game space, an instruction to end the creation mode, an instruction to shift to the play mode, and an instruction to end the game. That is, the user is allowed to perform these instructions by causing the menu image to be displayed.

The deletion icon 217 is an icon that allows an instruction to delete an object placed in the game space. For example, in the creation mode, the user performs an instruction to designate the deletion icon 217 and thereafter performs an instruction to designate an object placed in the game space, whereby the user can delete the designated object from the game space.

The clear condition icon 218 is an icon that allows an instruction to set a clear condition. In the exemplary embodiment, when an instruction to designate the clear condition icon 218 is made by the user, the game system 1 displays a condition setting window (FIG. 10) described below. Although the details will be described below, the user can set a clear condition by using a user interface in the condition setting window.

[2-3. Process of Setting Clear Condition]

Figure 10:
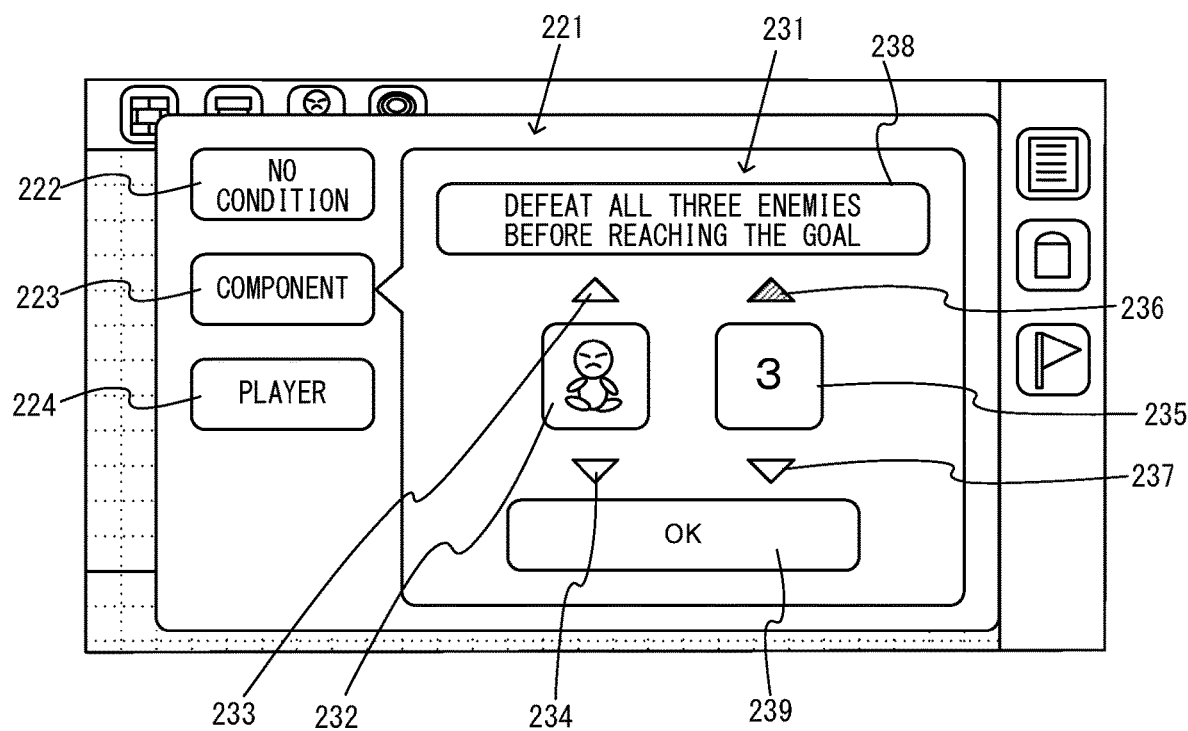
FIG. 10 shows an example of a game image including a condition setting window.

Next, a process of setting a clear condition will be described with reference to FIGS. 10 to 14. FIG. 10 shows an example of a game image including the condition setting window. The condition setting window is used by the user to set a clear condition, and includes images relating to various types of instructions for setting of the clear condition. As shown in FIG. 10, the condition setting window 221 includes a no condition button 222, a component condition button 223, and a player condition button 224.

The no condition button 222 is a button image that allows an instruction not to set a clear condition. That is, when an instruction to designate the no condition button 222 (e.g., an instruction made by touching the button) is performed, the clear condition setting means 154 does not set a clear condition.

The component condition button 223 is a button image that allows an instruction to set a component condition that is a type of clear condition. The component condition is a clear condition relating to an object (referred to as "component object") other than the player object, among objects placed in the game space. In the exemplary embodiment, as a component condition, a condition relating to an enemy object or an item object is used. Although the details will be described below, when an instruction to designate the component condition button 223 is performed, the candidate presentation means 153 displays a component condition window (see FIGS. 10 and 11) in the condition setting window 221.

The player condition button 224 is a button image that allows an instruction to set a player condition that is a type of clear condition. The player condition is a clear condition relating to the player object, and more specifically, a condition relating to the state of the player object. Although the details will be described below, when an instruction to designate the player condition button 224 is performed, the candidate presentation means 153 displays a player condition window (see FIG. 12) in the condition setting window 221.

As described above, in the exemplary embodiment, the game system 1 sets, as a clear condition, a component condition or a player condition. In another embodiment, the game system 1 may be capable of setting only one of a component condition and a player condition as a clear condition. In another embodiment, the game system 1 may be capable of setting, as a clear condition, (a) a condition in which a plurality of component conditions are combined, (b) a condition in which a plurality of player conditions are combined, and/or (c) a condition in which one or more component conditions are combined with one or more player conditions.

The condition setting window 221 shown in FIG. 10 is an image displayed when candidates relating to a component condition are presented. That is, when an instruction to designate the component condition button 223 is performed, the condition setting window 221 including the component condition window 231 is displayed as shown in FIG. 10.

In the exemplary embodiment, a component condition includes a target object and a condition value, such as, "three or more first enemy objects should be defeated" or "five or more coin objects should be collected". The target object is an object relating to the component condition (in the above example, the first enemy object or the coin object). In other words, the target object is an object on which an action that will cause a predetermined game event defined in the component condition is performed (in the above example, an action for defeating the enemy object or an action for collecting the coin object). A subject that performs the action defined in the clear condition is not limited to the player object. For example, in a puzzle game in which no player object appears, a clear condition that "three red blocks should be arranged" may be set. In this case, it can be said that a subject of the action "arrange" is the player himself/herself.

The condition value is a value (in the above example, three (enemy objects) or five (coin objects)) indicating the number that causes the predetermined game event (e.g., the enemy objects having been defeated or the coin objects having been collected) by the action on the target object, in order to satisfy the clear condition. The component condition window 231 is used by the user to set the target object and the condition value.

As described above, in the exemplary embodiment, the condition value in the component condition indicates a lower-limit value of the number of game events (e.g., the number of defeated enemy objects or the number of collected coin objects) caused by the action defined in the component condition. In another embodiment, the condition value may be an upper-limit value of the number of game events caused by the action defined in the component condition. Thus, the clear condition (specifically, the component condition) is a condition that a parameter indicating the number of game events caused by the action is a value within a predetermined range. The condition value may be a boundary value (specifically, an upper-limit value or a lower-limit value) of the predetermined range. In addition, the clear condition may be a condition including two boundary values as condition values, such as "from 3 to 5 first enemy objects should be defeated".

In another embodiment, the clear condition may be a condition that the parameter indicating the number of game events caused by the action coincides with the condition value. For example, the clear condition may be that "three first enemy objects should be defeated" (that is, the clear condition is not satisfied in the state where 2 or less first enemy objects or 4 or more first enemy objects have been defeated).

As shown in FIG. 10, the component condition window 231 includes a target object image 232, a first object change button 233, and a second object change button 234. These images 232 to 234 are images used by the user to select a target object in the clear condition.

The target object image 232 represents an object being selected as a target object used for the component condition. In FIG. 10, the target object image 232 represents the first enemy object 205, that is, indicates that the first enemy object 205 is being selected as the target object.

The first object change button 233 is a button image that allows an instruction to change the object being selected as the target object. That is, when an instruction to designate the first object change button 233 is performed, the candidate presentation means 153 changes the object represented by the target object image 232 in accordance with a predetermined order. The order of the objects to be represented by the candidate presentation means 153 is optional. For example, the objects may be represented in descending order of the placement number thereof in the game space, or in descending order of the frequency of having been set in clear conditions in the past.

The second object change button 234 is a button image that allows an instruction to change the object being selected as the target object. That is, when an instruction to designate the second object change button 234 is performed, the candidate presentation means 153 changes the object represented by the target object image 232 in the order reverse to the aforementioned order.

As described above, when changing the target object relating to the component condition, the user performs, several times, the instruction to designate the first object change button 233 or the second object change button 234 until his/her desired object is displayed as the target object image 232.

In the exemplary embodiment, as for each of component objects that can be placed in the game space, each time the component object is placed, the count means 152 counts the placement number thereof for each type of object. When the component condition window 231 is displayed, the candidate presentation means 153 presents, among the component objects, an object whose placement number is equal to or greater than 1 (i.e., an object placed in the game space), as a candidate of the target object in the component condition. That is, regardless of how many times the instruction to designate the first object change button 233 and/or the second object change button 234 has been performed, the candidate presentation means 153 does not display a target object image representing an object that is not placed in the game space being created.

According to the above configuration, the candidate presentation means 153 presents, as candidates, only objects that are highly likely to be used for the component condition, and does not present, as candidates, objects that are less likely to be used for the component condition (i.e., objects that are not currently placed in the game space). This allows the user to easily perform the operation of selecting a target object from the candidates. In addition, it is possible to reduce the likelihood that an unachievable clear condition (i.e., a clear condition relating to an object that is not placed in the game space) is set. In another embodiment, the candidate presentation means 153 may presents, as a candidate of a target object, a component object that can be placed in the game space, regardless of the placement number thereof (in other words, regardless of whether or not the component object is placed in the game space being created).

As shown in FIG. 10, the component condition window 231 includes a condition value image 235, an increment button 236, and a decrement button 237. These images 235 to 237 are images used by the user to select a condition value in a clear condition.

The condition value image 235 represents a value that is being selected as a condition value to be used for a component condition. In FIG. 10, the condition value image 235 represents "3", that is, represents that "3" is being selected as a condition value.

The increment button 236 is a button image that allows an instruction to increase by 1 the value being selected as a condition value. That is, when an instruction to designate the increment button 236 is performed once, the candidate presentation means 153 increases by 1 the value represented by the condition value image 235.

The decrement button 237 is a button image that allows an instruction to decrease by 1 the value being selected as a condition value. That is, when an instruction to designate the decrement button 237 is performed once, the candidate presentation means 153 decreases by 1 the value represented by the condition value image 235.

In the exemplary embodiment, values selectable as condition values are numbers equal to or greater than 1 and equal to or smaller than the placement number. For example, when the number of first enemy objects placed in the game space being created is 3, a condition value of a clear condition, in which the first enemy object is a target object, can be set within a range from 1 to 3. In this case, since the user can select three values from 1 to 3 as condition values for the clear condition, it can be said that the candidate presentation means 153 presents a group consisting of three candidates as candidates of the clear condition (specifically, candidates of the condition value).

When an increment instruction cannot be performed because the condition value being selected is a maximum value, the candidate presentation means 153 displays the increment button 236 in a display mode different from that in the case where the increment instruction can be performed. For example, in the example shown in FIG. 10, "3", which is the maximum value among the values selectable as a condition value, is being selected, and therefore an instruction to increase the condition value being selected cannot be performed. Therefore, the candidate presentation means 153 displays the increment button 236 in a grayed-out manner (in FIG. 10, the grayed-out manner is represented by hatching). Thus, the user can easily understand that the condition value being selected cannot be increased (i.e., the condition value being selected is the maximum value).

Although not shown in FIG. 10, the candidate presentation means 153 also displays the decrement button 237 in a grayed-out manner, like the increment button 236, when a decrement instruction cannot be performed because the condition value being selected is the minimum value.

In the exemplary embodiment, the number of candidates included in a group presented for one type of target object is equal to the placement number relating to the object. Therefore, as for one type of target object, the candidate presentation means 153 presents a group consisting of candidates as many as the placement number of the target object, as candidates of a clear condition (specifically, candidates of a condition value).

In another embodiment, values selectable as condition values may include 0. A clear condition in which a condition value is 0 may not be "0 or more enemy objects should be defeated" but may be "none of enemy objects should be defeated", for example.

In the exemplary embodiment, as an initial value to be firstly presented as a candidate of a condition value relating to a target object, the candidate presentation means 153 presents a value corresponding to the placement number relating to the target object (i.e., a value equal to the placement number). For example, in a state where three first enemy objects are placed in the game space being created, when a target object image representing the first enemy object is displayed in the component condition window 231, a condition value image representing "3" is firstly displayed. That is, when the target object is the first enemy object, a candidate of a clear condition in which a condition value is "3" is presented as an initial candidate.

As shown in FIG. 10, the component condition window 231 includes a clear condition image 238. The clear condition image 238 represents the content of a candidate being selected (i.e., the content of a clear condition). In the example shown in FIG. 10, since the target object image 232 represents the first enemy object and the condition value image 235 represents "3", the content of the candidate being selected is that "three or more first enemy objects should be defeated". Therefore, the clear condition image 238 represents a message "defeat all three enemies before reaching goal". By displaying the clear condition image 238, the game system 1 can present the candidate of the clear condition being selected so that the user can easily understand the content thereof.

In the example shown in FIG. 10, since "3", which is the maximum value among the values selectable as the condition value, is being selected, the clear condition image 238 represents the message "defeat all three enemies before reaching goal". If a condition value, which is not the maximum value, is being selected, the candidate presentation means 153 displays the clear condition image 238 representing a message "defeat n or more enemies before reaching goal" (n: natural number). When "0" is being selected as a condition value, the candidate presentation means 153 may display the clear condition image 238 representing a message "reach the goal without defeating any enemies". Thus, the candidate presentation means 153 changes the content represented by the clear condition image 238 in accordance with the condition value being selected. Thus, the candidate of the clear condition being selected can be presented so that the user can more easily understand the content thereof.

As shown in FIG. 10, the component condition window 231 includes a condition determination button image 239. The condition determination button image 239 is a button image that allows an instruction to set a clear condition. That is, when an instruction to designate the condition determination button image 239 is performed, the clear condition setting means 154 sets the candidate being selected, as a clear condition. For example, when an instruction to designate the condition determination button image 239 is performed in the state shown in FIG. 10, a clear condition that "three or more first enemy objects should be defeated" is set.

Figure 11:
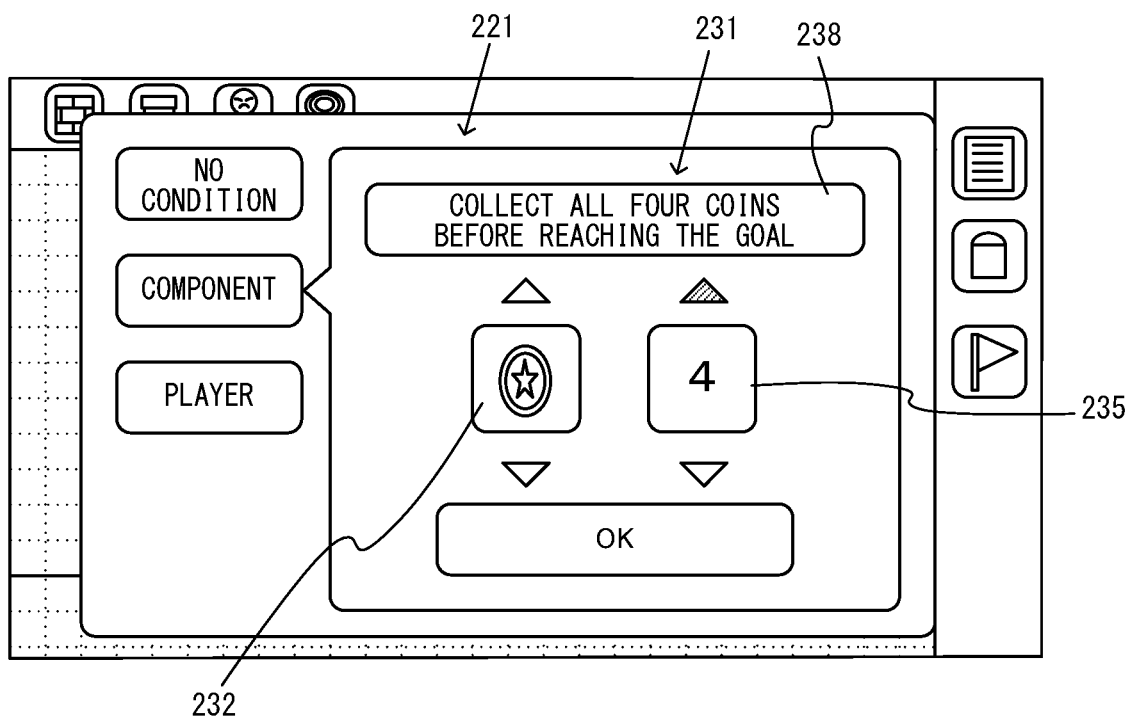
FIG. 11 shows another example of a game image including a condition setting window.

FIG. 11 shows another example of a game image including a condition setting window. FIG. 11 shows a game image that is displayed when the target object has been changed to the coin object from the state where the component condition window 231 shown in FIG. 10 is displayed. That is, the target object image 232 included in the component condition window 231 shown in FIG. 11 represents the coin object.

In the example shown in FIG. 11, four coin objects are placed in the game space that is currently created. Therefore, an initial value that is presented as a candidate of a condition value is "4", and the condition value image 235 represents "4". Thus, in the exemplary embodiment, the initial value presented as the candidate of the condition value can be changed in response to change of the object presented as the candidate of the target object.

In the example shown in FIG. 11, a condition value in a clear condition having the coin object as the target object can be set within a range from 1 to 4. Therefore, when the coin object is being selected as the target object, the user can select four candidates from 1 to 4. That is, when the coin object is being selected as the target object, the candidate presentation means 153 presents a group consisting of four candidates of a clear condition (in contrast to the case where the first enemy object is being selected as the target object.

When the candidate of the target object is changed from the enemy object to the coin object, an action to be performed by the player object on the target object in order to satisfy the clear condition is changed from "an action for defeating (the enemy object)" to "an action for obtaining (the coin object)". Therefore, in FIG. 11, the clear condition image 238 represents a message "collect all four coins before reaching goal".

As described above, when a component condition is set as a clear condition, the user first designates the component condition button 223 to cause the component condition window 231 to be displayed. Next, the user designates the buttons 233, 234, 236, and/or 237 according to need to change the candidate of the clear condition being selected (specifically, the target object and the condition value). Further, the user designates the condition determination button image 239 with his/her desired candidate being selected. Thus, the user can set, as the clear condition, the desired candidate among the presented candidates.

As described above, in the exemplary embodiment, the candidate presentation means 153 presents candidates of a clear condition in such a manner that the user can select, independently from each other, the type of an object relating to the clear condition (i.e., a target object), and a condition value relating to the number of game events caused by an action. In addition, the candidate presentation means 153 changes a candidate group consisting of a plurality of candidates having different condition values (i.e., a group of candidates having different condition values) in accordance with the type of the object selected by the user. For example, in the examples shown in FIGS. 10 and 11, when the first enemy object is being selected as the target object, a candidate group consisting of three candidates of the condition value is presented; whereas when the coin object is being selected as the target object, a candidate group consisting of four candidates of the condition value is presented. Thus, an appropriate number of candidates can be presented by changing the number of the candidates included in the candidate group in accordance with the target object, thereby facilitating the user's operation of setting the clear condition.

In the exemplary embodiment, as an example of a method of presenting one or more candidates of a clear condition in a selectable manner for the user, the candidate presentation means 153 adopts the method of displaying a candidate being selected, and changing the selected candidate in accordance with an instruction of the user. However, any presentation method may be adopted.

For example, in the exemplary embodiment, the candidate presentation means 153 changes the target object being selected and the condition value being selected, independently from each other, according to an instruction of the user. In another embodiment, the candidate presentation means 153 may collectively change the target object being selected and the condition value being selected, according to an instruction of the user. For example, the clear condition image 238 and a change button may be displayed in the component condition window 231, and the clear condition being selected, which is represented by the clear condition image 238, may be changed according to an instruction to designate the change button. Since the message represented by the clear condition image 238 includes information about the target object and the condition value, the user can collectively change the target object and the condition value through the instruction with the change button.

In the exemplary embodiment, the candidate presentation means 153 displays only one candidate being selected. In another embodiment, all the candidates may be simultaneously displayed. For example, the candidate presentation means 153 may display a list of objects to be candidate objects and a list of values to be condition values. In another embodiment, the candidate presentation means 153 may display a range of condition values (e.g., "1-5") that are selectable by the user.

In another embodiment, the user may be allowed to select one of: designating an upper-limit value; designating a lower-limit value; and designating a range (i.e., the upper-limit value and the lower-limit value) in the clear condition. For example, the candidate presentation means 153 may display, in the component condition window 231, a range button indicating any of "less", "more", and "range". At this time, the candidate presentation means 153 changes the content (i.e., "less", "more", or "range") indicated by the range button, in accordance with an instruction to designate the range button. Thus, it is possible to set the clear condition in which the condition value being selected is a boundary value according to the content indicated by the range button. For example, in a case where the target object is the enemy object, the condition value is "3", and the range button indicates "more", the clear condition is that "three or more enemy objects should be defeated". When the range button indicates "range", the candidate presentation means 153 may display two sets of the images 235 to 237 so that the user can select two types of condition values, i.e., the lower-limit value and the upper-limit value. This allows an increase in variation for settable clear conditions.

In the exemplary embodiment, the candidate presentation means 153 presents the condition value equal to the placement number, as the initial candidate that is firstly presented among the candidates of the clear condition. In a case where the user places a predetermined number of objects in the game space in the creation mode, it is highly likely that the user will set, as a clear condition, that a game event for satisfying the clear condition should be caused for the predetermined number of objects (e.g., all enemy objects placed are defeated, or all coin objects placed are obtained). Therefore, by presenting, as the initial value, the candidate having the condition value corresponding to the number (i.e., the placement number) of the objects placed in the game space, the user is saved the trouble of performing the operation of changing the candidate of the condition value (i.e., the operation of designating the increment button 236 or the decrement button 237). Thus, the operation of setting the clear condition is facilitated.

In another embodiment, the initial value presented as the candidate of the condition value may be a value different from the placement number. For example, when changing the clear condition that has already been set (i.e., when the clear condition for the game space being created has already been set), the candidate presentation means 153 may present, as the initial candidate, the content of the already set clear condition. Therefore, in another embodiment, when no clear condition is set for the game space, the candidate presentation means 153 may present, as the initial candidate, the candidate indicating the condition value corresponding to the placement number; whereas when a clear condition has been set for the game space, the candidate presentation means 153 may present, as the initial candidate, the content of the set clear condition.

Figure 12:
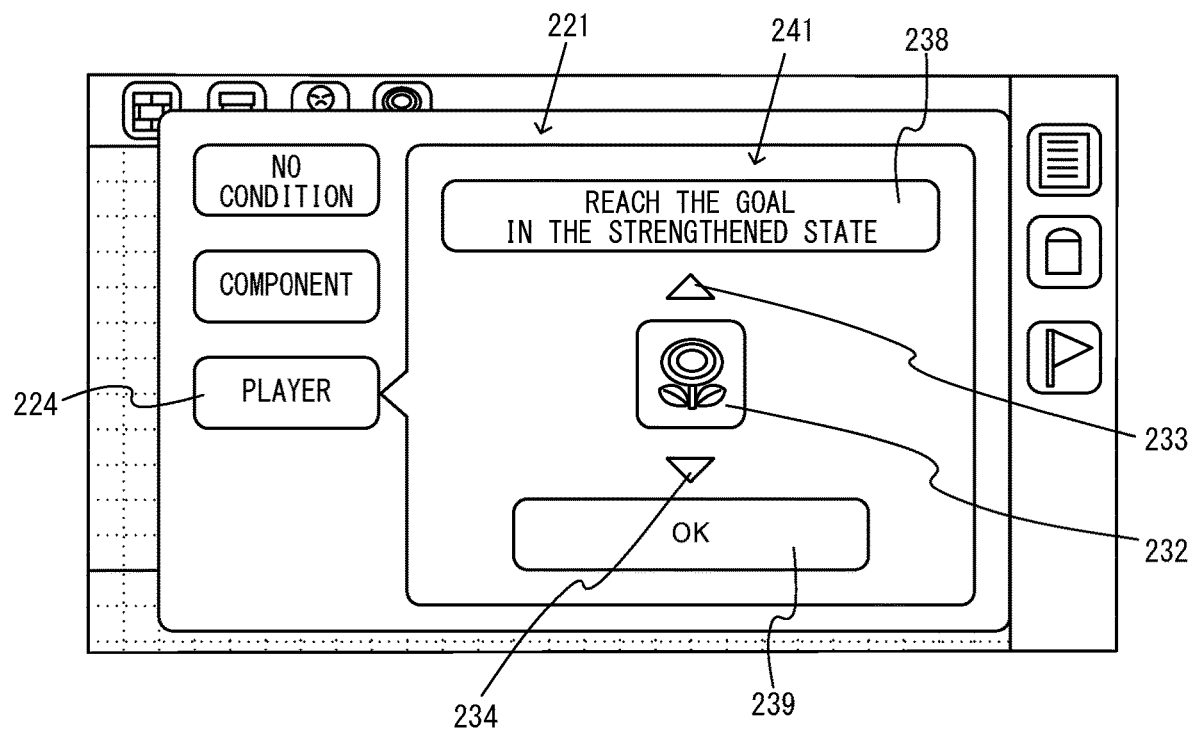
FIG. 12 shows an example of a game image including a condition setting window used for setting a player condition.

FIG. 12 shows an example of a game image including a condition setting window for setting a player condition. The condition setting window 221 shown in FIG. 12 is an image that is displayed when candidates relating to a player condition are presented. That is, when an instruction to designate the player condition button 224 is performed, the condition setting window 221 including a player condition window 241 is displayed as shown in FIG. 12.

In the exemplary embodiment, the player condition is that the player object enters a state (e.g., the strengthened state described above) different from the normal state by obtaining a predetermined item object. That is, the player condition includes a target object (more specifically, the item object obtained by the player object).

The item object that causes the state of the player object to change is not limited to item objects directly placed in the game space. For example, in a case where an enemy object that can be placed in the game space has a predetermined item object and the player object can obtain the item object on the condition that the player object defeats the enemy object, the state of the player object may be changed by the item object.

As shown in FIG. 12, the player condition window 241 includes a target object image 232, a first object change button 233, and a second object change button 234 which are similar to those of the component condition window 231. Since the player condition includes no condition value, the player condition window 241 does not include images (i.e., the images 235 to 237 shown in FIG. 10) used for setting condition values.

An object that can be a target object in the player condition is an item object that causes the state of the player object to change (this item object is referred to as "change item object"). Therefore, the count means 152 counts, for each of item objects that can be placed in the game space, the placement number for each type of object. When the player condition window 241 is displayed, the candidate presentation means 153 presents, as candidates of the target object in the player condition, objects whose placement numbers are equal to or greater than 1 (i.e., objects placed in the game space) among the change item objects. Therefore, the target object image 232 included in the player condition window 241 represents only the change item objects placed in the game space being created.

In the example shown in FIG. 12, the target object image 232 represents a flower object that causes the player object to enter the aforementioned strengthened state. The clear condition image 238 represents a message "reach the goal in the strengthened state". In the exemplary embodiment, when the player object, which has obtained the flower object and thereby entered the strengthened state, touches an enemy object, the player object returns from the strengthened state to the normal state. Therefore, the clear condition represented by the clear condition image 238 is not merely a condition that "the player object should obtain the flower object", but is a condition that "the player object should reach the goal in the strengthened state with the flower object".

The player condition is not limited to the condition relating to the strengthened state, and may be a condition relating to the normal state. For example, in the example shown in FIG. 12, a player condition that "the player object should reach the goal in the normal state" can be set.

The change item object may be used as a target object in the component condition, in addition to (or instead of) being used as a target object in the player condition. That is, when the flower object is placed in the game space, a clear condition that "the player object should reach the goal in the strengthened state" may be presented as a player condition, and a clear condition that "n flower objects should be obtained" (n: natural number) may be presented as a component condition.

The player condition window 241 is identical to the component condition window 231 in that the object being selected as the target object is changed according to an instruction performed to the object change buttons 233 and 234.

As described above, in the exemplary embodiment, in either case where the component condition window 241 is displayed or where the player condition window 231 is displayed, candidates based on the count number are presented as candidates of the clear condition. That is, when the component condition window 231 is displayed, the candidate presentation means 153 determines, based on the count number, candidates of the target object and candidates of the condition value. Meanwhile, when the player condition window 241 is displayed, the candidate presentation means 153 determines, based on the count number, candidates of the target object. Specifically, when the player condition window 241 is displayed, candidates are determined based on whether or not the placement number of the target object is 1 or more (in other words, whether or not the target object is present). Thus, by presenting candidates based on the count number, appropriate candidates can be presented to the user, whereby the operation of setting the c6lear condition is facilitated.

In the exemplary embodiment, the game system 1 switches the window between the case of setting a component condition and the case of setting a player condition. In another embodiment, the game system 1 may not switch the window between these cases. For example, the game system 1 may present, in a single window, an object relating to a component condition (e.g., an enemy object) and an object relating to a player condition (e.g., a flower object) in accordance with instructions made to the object change buttons 233 and 234, respectively.

(Process of Automatically Changing Clear Condition)

In the creation mode according to the exemplary embodiment, the user can perform an instruction to place an object in a game space even after a clear condition has been set. In the exemplary embodiment, when arrangement of objects in the game space is changed while a clear condition is set, the game system 1 automatically changes the clear condition under a predetermined condition. Hereinafter, a process of automatically changing a clear condition will be described in detail.

Figure 13:
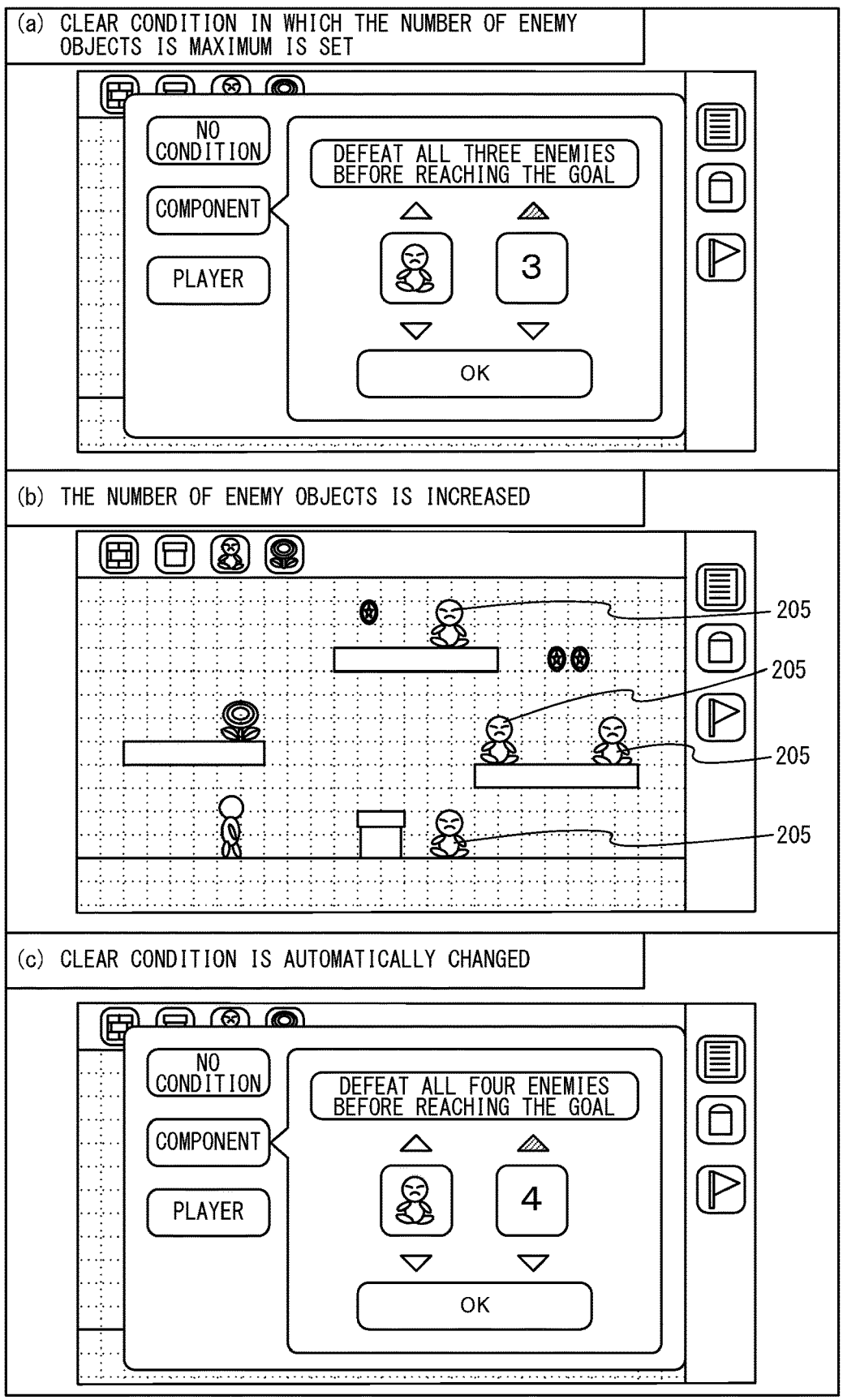
FIG. 13 shows an example of a flow of an operation for automatically changing a clear condition.

FIG. 13 shows an example of a flow of an operation for automatically changing a clear condition. In the example shown in FIG. 13, in the creation mode, three first enemy objects have already been placed in the game space.

In FIG. 13, (a) shows a state where the condition setting window including the component condition window is displayed. In the state shown in (a) of FIG. 13, the clear condition setting means 154 sets a clear condition that "all three first enemy objects should be defeated". That is, a clear condition, in which a condition value takes a maximum value (i.e., 3) within a settable range (i.e., from equal to or greater than 1 to equal to or smaller than 3), is set.

In FIG. 13, (b) shows a state where, after the clear condition has been set, the condition setting window is closed and the game image used for creating a game space is displayed again. In the state shown in (b) of FIG. 13, the object placement means 151 additionally places one first enemy object in the game space, based on an instruction of the user. That is, four first enemy objects are placed in the game space.

As described above, in the case where the clear condition in which the condition value is the maximum value is set, if the placement number of the object (the first enemy object in this case) relating to the clear condition is changed, the clear condition setting means 154 resets (in other words, changes) the clear condition. Specifically, in the above case, the clear condition is reset such that the changed placement number of the object is used as the condition value. In FIG. 13, (c) shows a state where, after the state shown in (b) of FIG. 13, the condition setting window including the component condition window is displayed. In the example shown in FIG. 13, as shown in (c) of FIG. 13, the clear condition is reset such that the condition value is "4".

In the example shown in FIG. 13, the condition setting window is displayed again after the placement number of the object has been changed. However, resetting of the clear condition is performed regardless of whether or not the condition setting window is displayed. As described above, each time an object is added or deleted in the game space, the count means 152 counts the placement number of the object. Then, the clear condition setting means 154 resets the clear condition at a timing according to the change in the placement number of the object relating to the clear condition. In another embodiment, resetting of the clear condition may be performed when the condition setting window is displayed after the placement number of the object has been changed.

As described above, in the exemplary embodiment, in the case where the placement number of the object (specifically, the object relating to the clear condition) placed in the game space is changed after the clear condition, in which the condition value is equal to the placement number (i.e., the condition value is the maximum value), has been set, the clear condition setting means 154 resets the clear condition such that the changed placement number of the object is equal to the condition value.

When the user sets the clear condition in which the condition value is the maximum value, the user is supposed to intend that the clear condition will be "a predetermined type of objects placed in the game space should be all defeated". Therefore, if the user increases the placement number of the predetermined type of objects after the clear condition in which the condition value is the maximum value has been set, the user is highly likely to desire an increase in the condition value in the clear condition with the increase in the placement number. Therefore, in the exemplary embodiment, when the game system 1 automatically resets the clear condition in the above case, the user is saved the trouble of performing an operation of resetting the clear condition. Thus, the operation of setting the clear condition can be further facilitated.

The "automatic resetting of the clear condition" indicates resetting of the clear condition by the game system 1 without the user's operation of setting the clear condition (i.e., the operation of selecting a target object and/or a condition value). For example, the mode, in which the game system 1 resets the clear condition without any operation performed by the user as in the exemplary embodiment, corresponds to the "automatic resetting of the clear condition". Alternatively, for example, in the case where the placement number of the target objects is increased according to an instruction of the user after the clear condition in which the condition value is the maximum value has been set, the game system 1 may receive, from the user, a permission instruction indicating that the user permits resetting of the clear condition. This permission instruction may be an instruction to designate the clear condition icon 218, or an instruction to select "Yes" in response to a message "Do you want to change the clear condition?". In addition to the mode of the exemplary embodiment, the mode, in which the game system 1 resets the clear condition according to the permission instruction, also corresponds to the "automatic resetting of the clear condition".

(Process of Correcting Placement Number)

In the exemplary embodiment, in addition to directly placing objects in the game space, the user can cause an object to appear from another predetermined object (a pipe object in this case) placed in the game space. For example, when the user places an enemy object at the position of a pipe object in the creation mode, the enemy object appears from the pipe object in the play mode. Hereinafter, a method of counting the placement number in the case where an object appears from another predetermined object, will be described.

Figure 14:
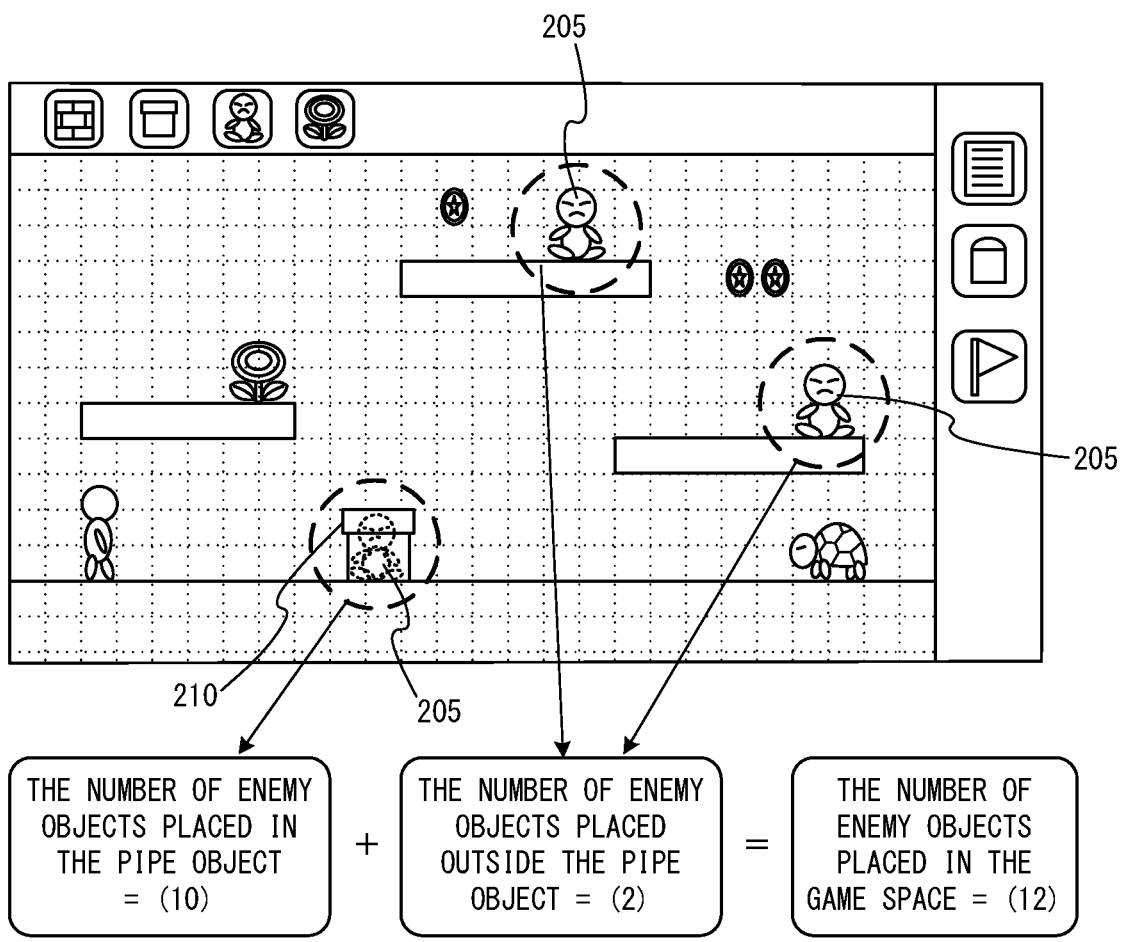
FIG. 14 shows an example of a placement number counting method.

FIG. 14 shows an example of the method of counting the placement number. In FIG. 14, two first enemy objects 205 are directly placed in the game space, and a first enemy object 205 is placed in a pipe object 210 placed in the game space. In the creation mode, the enemy object placed in the pipe object 210 may not be displayed, or may be displayed in a display mode different from usual (e.g., semi-transparently). In FIG. 14 the first enemy object 205 placed in the pipe object 210 is represented by a dotted line. In the exemplary embodiment, by placing the enemy object while designating the position of the pipe object 210 in the creation mode, the enemy object can be placed in the pipe object 210. In another embodiment, the object placement means 151 may place, in the pipe object, an item object in addition to (or instead of) the enemy object, based on an instruction of the user.

In the exemplary embodiment, when the enemy object is placed in the pipe object 210, a predetermined number of (e.g., ten) enemy objects appear from the pipe object 210 in turn in the play mode. Therefore, it can be said that, when the enemy object is placed in the pipe object 210, a different number of enemy objects, from the number of enemy objects displayed in the creation mode, are placed actually (in other words, in the play mode).

Therefore, in the exemplary embodiment, when the first enemy object 205 is placed in the pipe object 210, the count means 152 counts the placement number of the first enemy objects 205 directly placed in the game space (i.e., placed outside the pipe object 210), and corrects the counted placement number in accordance with the pipe object 210 from which the first enemy objects 205 appear. Specifically, the count means 152 corrects the placement number ("2" in FIG. 14), which has been obtained by counting the first enemy objects 205 directly placed in the game space, so as to add the number ("10" in this case) of the first enemy objects 205 that appear from the pipe object 210 (see FIG. 14) to the placement number. Therefore, in the example shown in FIG. 14, the corrected placement number is "12".

The correction amount of the placement number need not be equal to the number of the enemy objects that appear from the pipe object 210. For example, in another embodiment, the count means 152 may add, to the placement number before corrected, half ("5" in the above example) the number of the enemy objects that appear from the pipe object 210.

The correction amount of the placement number is an amount corresponding to the number of pipe objects each having an enemy object placed therein. For example, in the exemplary embodiment, when three pipe objects, each having an enemy object placed therein, are placed in the game space, the count means 152 corrects the placement number by adding "30" to the placement number.

As described above, when the placement number is corrected, the number of candidates of the condition value in the clear condition is also changed according to the placement number. For example, in the example shown in FIG. 14, the number of candidates of the condition value in the clear condition relating to the first enemy object is 12 (from 1 to 12).

As described above, in the exemplary embodiment, the object placement means 151 can place, in the game space, a specific object (i.e., a pipe object in which an enemy object is placed) that causes objects (i.e., enemy objects) to appear in the game space during the game play. At this time, the count means 152 corrects the placement number in accordance with the number of specific objects placed in the game space. Thus, even when the specific object is placed, the game system 1 can accurately count the number of the objects that actually appear during the game play. Thus, the game system 1 can present the candidates of the clear condition according to the number of the objects that actually appear.

In another embodiment, the specific object may have a function of converting a predetermined object into an object relating to the clear condition. For example, the specific object may be a switch object, and the switch object may have a function of converting a block object into a coin object when the player object touches the switch object. The switch object may convert a block object into a coin object only for a predetermined period, or permanently.

When the switch object is placed in the game space, the count means 152 may correct the placement number in accordance with the placement of the switch object. That is, the count means 152 may correct the placement number in accordance with the number of block objects that can be converted into coin objects by the switch object. For example, when the switch object has a function of converting a block object into a coin object only for a predetermined period, the count means 152 may correct the placement number of the coin objects, based on the number of block objects placed around the switch object (e.g., placed within a predetermined distance from the switch object).

In the above description, if the placement number of the coin objects is corrected based on the number of the block objects, a clear condition that cannot be actually achieved may be set depending on the positional relationship between the switch object and the block objects. Therefore, in another embodiment, when the switch object is placed in the game space, the clear condition setting means 154 may inhibit setting of a clear condition (a clear condition relating to at least coin objects).

In another embodiment, the object placement means 151 may place an intermediate point in the game space, based on an instruction of the user. The intermediate point is a restart position in the case where the game is over during the play mode. That is, when, in the play mode, the game is over after the player object has passed the intermediate point, the player can restart the game from the state where the player object is located at the intermediate point. When the game is restarted from the intermediate point, there is a likelihood that the player object cannot achieve the clear condition. For example, in a case where the clear condition is to obtain an item object placed behind the intermediate point and the player object cannot return to a position behind the intermediate point, if the game is restarted from the intermediate point, the player object cannot achieve the clear condition. Therefore, when such an intermediate point is placed in the game space, the clear condition setting means 154 may inhibit setting of a clear condition.

[2-4. Processing in Play Mode]

Next, an outline of processing in the play mode will be described with reference to FIGS. 15 and 16. In the exemplary embodiment, the game system 1 stores (in other words, retains) therein stage information indicating a game space created in the creation mode. For example, in response to a retention instruction made by the user to the aforementioned menu image, the game system 1 stores therein the stage information indicating the game space that has been created.

The stage information stored in the game system 1 may be uploaded to a server via a network, or may be transmitted to another game system different from the game system 1. At this time, the stage information generated in the game system 1 may be used in the play mode in the other game system.

Figure 15:
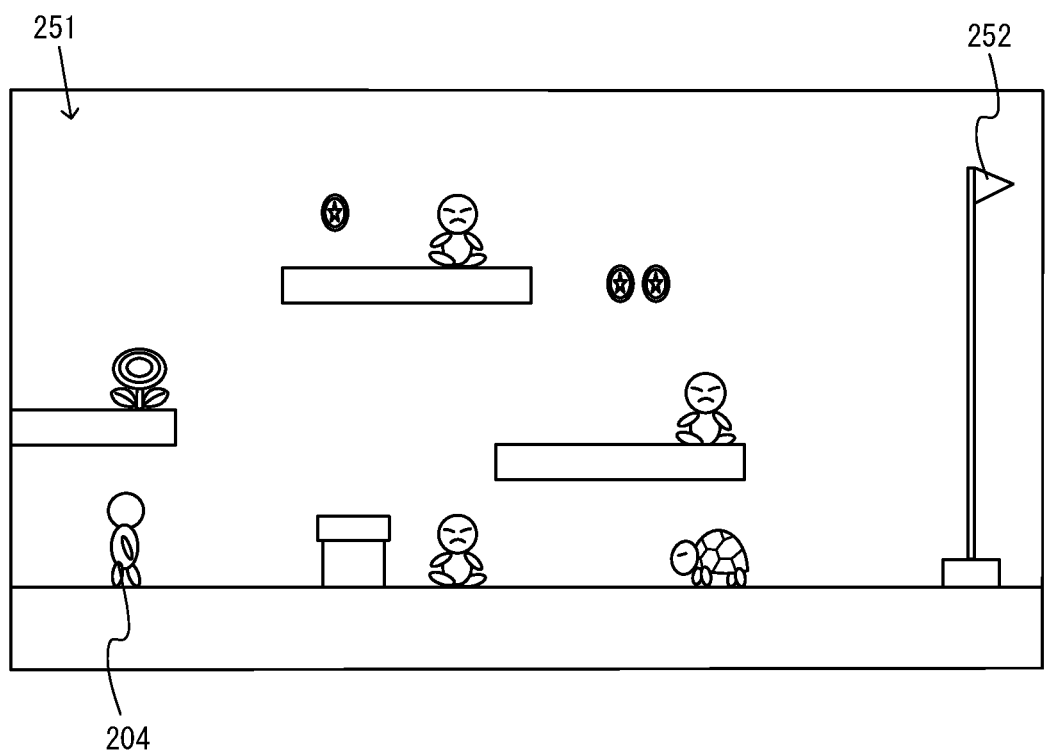
FIG. 15 shows an example of a game image displayed in a play mode.

FIG. 15 shows an example of a game image displayed in the play mode. As shown in FIG. 15, in the play mode, a game space image 251 representing the game space is displayed on the display device. This game space is a game space indicated by the stage information stored in the game system 1. In the play mode, a player object 204 is placed in the game space. In the play mode, the game execution means 155 controls the motion of the player object in the game space in accordance with an instruction of the player. That is, in the play mode, the player can perform a game by using the game space created in the creation mode.

As shown in FIG. 15, in the exemplary embodiment, a goal object 252 is placed in the game space. The goal object 252 is an object indicating a goal position in the game space. That is, the game execution means 155 determines that the game in the game space (in other words, the stage) has been cleared, on the condition that the player object 204 has reached the position of the goal object 252 placed in the game space (in other words, the player object 204 has touched the goal object 252).

In the exemplary embodiment, in a case where a clear condition is set for the game space in which the game is played, the game is not cleared by the player object 204 having simply reached the position of the goal object 252. That is, the game execution means 155 determines that the game has been cleared, when the player object 204, satisfying the clear condition, has reached the position of the goal object 252 in the game space. If no clear condition is set for the game space (i.e., if no clear condition has been set in the creation mode), the game execution means 155 determines that the game has been cleared when the player object 204 has reached the position of the goal object 252.

As described above, in the exemplary embodiment, the clear condition is a necessary condition for clearing the game. That is, the game is not cleared only by the clear condition having been satisfied during the game play. The player can clear the game by causing the player object 204 to reach the goal position while satisfying the clear condition. In another embodiment, the game execution means 155 may determine that the game has been cleared, in response to only the clear condition having been satisfied (even when the player object 204 has not reached the goal position). That is, the game execution means 155 may use the clear condition as a sufficient condition for the game to be cleared.

In the exemplary embodiment, there are cases where the clear condition is satisfied during the game play (in other words, before the game is cleared). Therefore, in the exemplary embodiment, when the clear condition has been satisfied during the game play using the game space, the game execution means 155 notifies the player that the clear condition has been satisfied. Thus, the player can know whether or not the clear condition has been satisfied even before reaching the goal position, whereby the convenience of the player can be improved. In another embodiment, notification to the player may be performed by outputting a voice message in addition to (or instead of) displaying an image.

Figure 16:
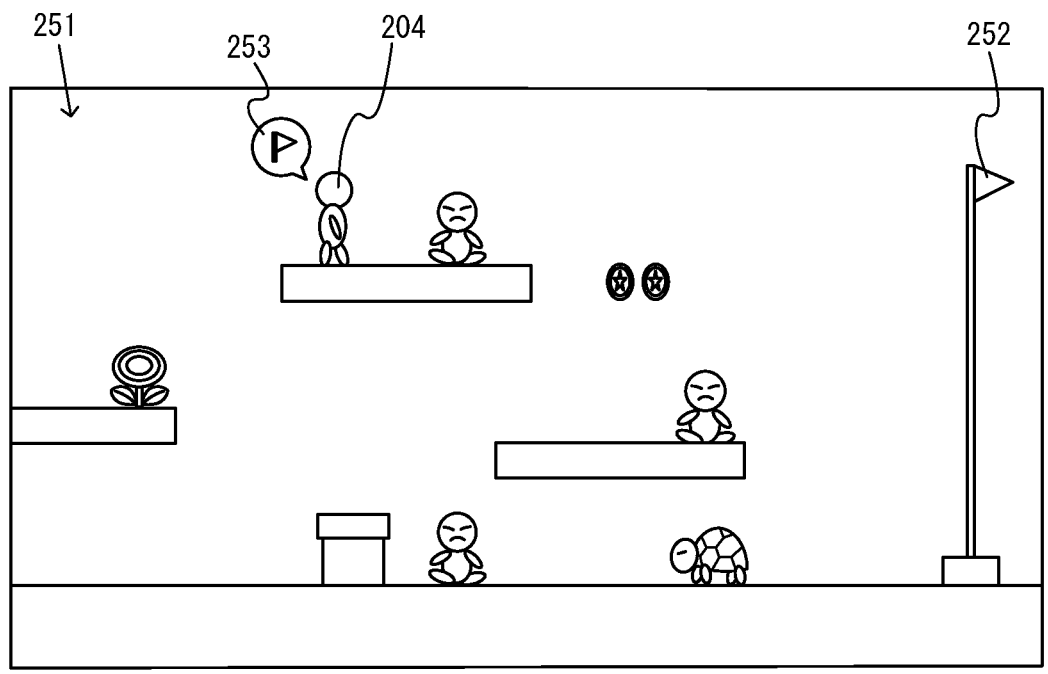
FIG. 16 shows an example of a game image displayed when a clear condition has been satisfied in the play mode.

FIG. 16 shows an example of a game image displayed when a clear condition has been satisfied in the play mode. As shown in FIG. 16, in the exemplary embodiment, when the clear condition has been satisfied during game play, the game execution means 155 displays a clear mark 253 in the vicinity of the player object 204. That is, as the display position of the player object 204 is changed after the clear condition has been satisfied, the display position of the clear mark 253 is also changed so as to be displayed in the vicinity of the player object 204.

As described above, in the exemplary embodiment, the game execution means 155 displays a predetermined image (i.e., the clear mark 253), which represents that the clear condition has been satisfied, in association with the position of the player object that is operated by the player. Thus, it is possible to notify the player that the clear condition has been satisfied, in an easy-to-understand manner. In the exemplary embodiment, since the predetermined image is displayed at the position to which the player pays attention (i.e., the position of the player object), the image can be presented so as to be easily realized by the player. In a case where a plurality of player objects appear in the game space (see "(Modification relating to game in play mode)" described below), it is possible to notify each player of a player object that has satisfied the clear condition, among the plurality of player objects, in an easy-to-understand manner. The predetermined image is optional.

Any method may be adopted to notify the player that the clear condition has been satisfied. For example, in another embodiment, the game execution means 155 may display a message indicating that the clear condition has been satisfied, at a predetermined position (e.g., an upper left position) on the display screen. Alternatively, for example, the game execution means 155 may change the display mode of the player object when the clear condition has been satisfied.

In a case where the clear condition, which was once satisfied, has become non-satisfied, the game execution means 155 deletes the clear mark. For example, in a case where the player object, which entered the strengthened state by obtaining the flower object and thereby satisfied the clear condition, has touched an enemy object and thereby returned to the normal state, the game execution means 155 deletes the clear mark.

Although not shown in FIG. 16, in the exemplary embodiment, in a case where the player object 204 has reached the goal position with the clear condition being not satisfied, the game execution means 155 notifies the player that the clear condition is not satisfied. In this case, for example, the game execution means 155 may display a message such as "satisfy the clear condition before reaching goal" or "collect 10 coins before reaching goal". The message may be displayed in any position. For example, the message may be displayed in association with the player object 204 or the goal position. Alternatively, the message may be displayed at a predetermined position (e.g., an upper left position) on the display screen.

[3. Specific Example of Processing in Game System]

Next, a specific example of information processing in the game system 1 will be described with reference to FIGS. 17 to 19.

[3-1. Data Used for Information Processing]

Figure 17:
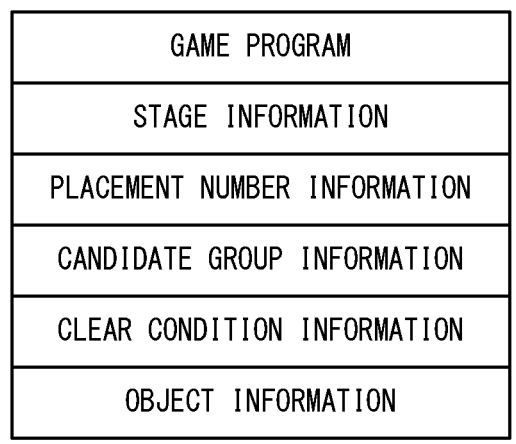
FIG. 17 shows examples of various types of information used for information processing in the non-limiting game system.

FIG. 17 shows examples of various types of information used for the information processing in the game system 1. The various types of information shown in FIG. 17 is stored in a storage medium (e.g., the flash memory 84, the DRAM 85, and/or the memory card attached to the slot 23) accessible by the main body apparatus 2.

As shown in FIG. 17, the game system 1 stores a game program therein. The game program is a program for executing the game of the exemplary embodiment, and is stored in, for example, the flash memory 84 and/or the memory card attached to the slot 23.

As shown in FIG. 17, the game system 1 stores therein stage information, placement number information, candidate group information, clear condition information, and object information. These pieces of information (in other words, data) are generated and used in game processing (FIGS. 18 and 19) described below.

The stage information indicates a game space (in other words, a game stage) created in the creation mode. As described above, the stage information includes information relating to objects placed in the game space. Therefore, the game system 1 can create the game space, based on the stage information. In the exemplary embodiment, the stage information is generated and stored for each stage.

The placement number information indicates the aforementioned placement number. In the exemplary embodiment, in a case where the placement number is counted for each of a plurality of types of objects, the placement number information indicates the placement number for each type of object.

The candidate group information indicates a group of candidates of a clear condition to be presented to the user. Specifically, when candidates are presented with respect to the aforementioned component condition (i.e., when the component condition window is displayed), the candidate group information includes target object candidate information and condition value candidate information. The target object candidate information indicates one or more candidates relating to a target object. For example, the target object candidate information may information indicating the types of objects to be the candidates (specifically, a list of the types of objects to be the candidates). The condition value candidate information indicates one or more candidates relating to a condition value. For example, the condition value candidate information may be information indicating a possible range (e.g., from equal to or greater than 1 to equal to or smaller than 3) of the condition value. When candidates are presented with respect to the aforementioned player condition (i.e., when the player condition window is displayed), the candidate group information includes the target object candidate information.

The clear condition information indicates a clear condition that is set for the game space (in other words, stage) created in the creation mode. Specifically, when the clear condition is a component condition, the clear condition information includes information indicating a target object and information indicating a condition value. When the clear condition is a player condition, the clear condition information includes information indicating a target object. In the exemplary embodiment, the clear condition information is stored in association with the stage information relating to the game space for which the clear condition is set.

The object information indicates information relating to various objects (specifically, a player object, an enemy object, an item object, etc.) placed in the game space during game play in the play mode. The object information is information for defining the objects placed in the game space, and specifically indicates the state, position, direction, and the like of each object.

[3-2. Processing Executed in Game System]

Figure 18:
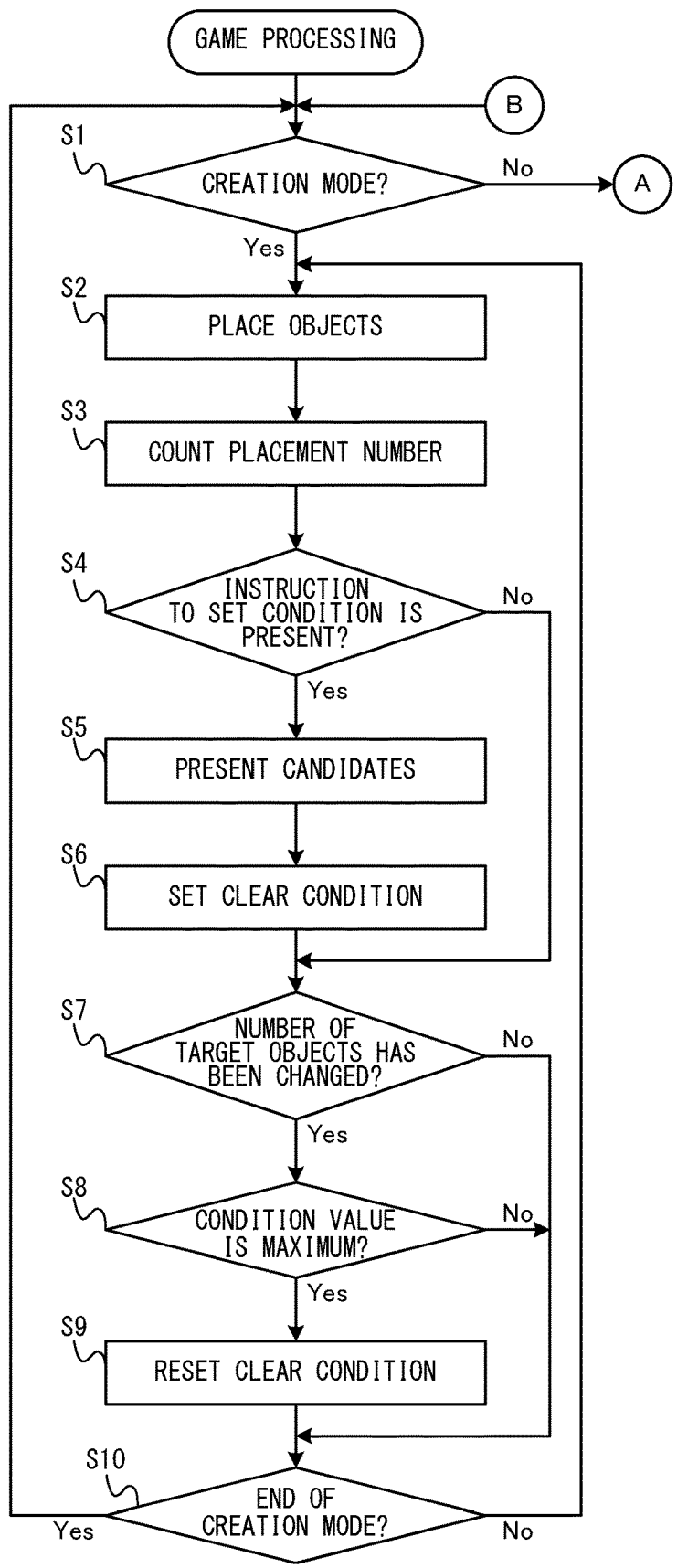
FIG. 18 is a flowchart showing an example of a flow of game processing executed by the non-limiting game system.
Figure 19:
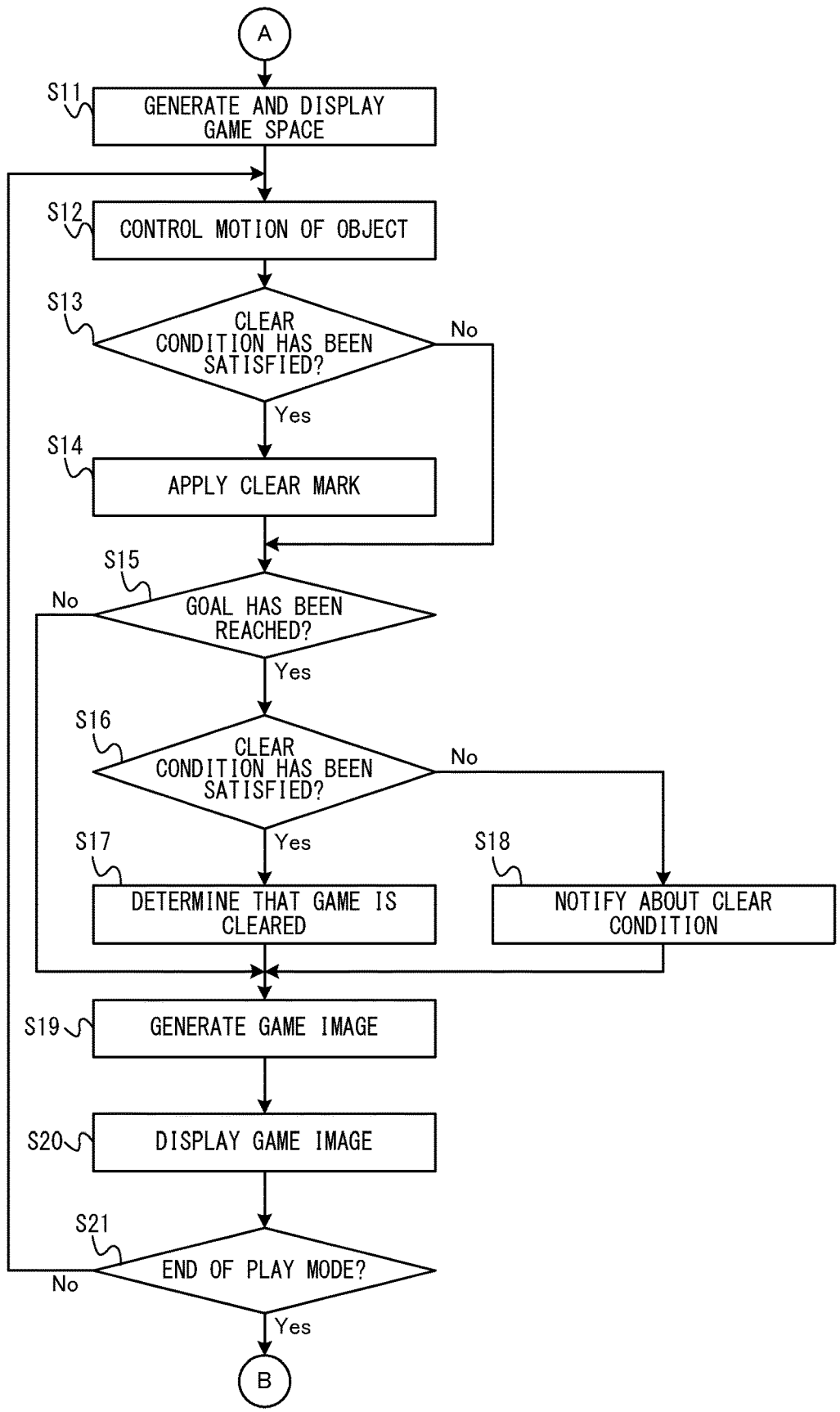
FIG. 19 is a flowchart showing an example of a flow of game processing executed by the non-limiting game system.

FIGS. 18 and 19 are flowcharts showing an example of a flow of game processing executed by the game system 1. The sequential game processing shown in FIGS. 18 and 19 is started in response to the game program being started up by the processor 81.

In the exemplary embodiment, the processor 81 of the main body apparatus 2 executes the game program stored in the game system 1, thereby executing processes in steps shown in FIGS. 18 and 19. However, in another embodiment, some of the processes in the steps may be executed by a processor (e.g., a dedicated circuit) other than the processor 81. When the game system 1 is communicable with another information processing apparatus (e.g., a server), some of the processes in the steps shown in FIGS. 18 and 19 may be executed by the other information processing apparatus. The processes in the steps shown in FIGS. 18 and 19 are merely examples, and as long as the same result is obtained, the order of the processes in the respective steps may be changed, or another process may be executed in addition to (or instead of) the process in each step.

The processor 81 executes the processes in the steps shown in FIGS. 18 and 19 by using a memory (e.g., the DRAM 85). That is, the processor 81 stores information (in other words, data) obtained in the respective process steps in the memory. When the information is to be used in the subsequent process steps, the processor 81 reads out the information from the memory and uses the information.

In the series of processes shown in FIGS. 18 and 19, the processor 81 acquires an instruction of the user by receiving data indicating an input performed on the input section (e.g., the touch panel 13, the buttons, and/or the analog stick) of the game system 1, from the input section.

In step S1 shown in FIG. 18, the processor 81 determines whether or not to execute the creation mode. In the exemplary embodiment, the processor 81 determines whether to execute the creation mode or the play mode, based on an instruction of the user. For example, in step S1, a selection screen that allows selection between the creation mode and the play mode is displayed on the display device. With the selection screen being displayed, the processor 81 receives an instruction to designate either the creation mode or the play mode, and acquires the instruction. When the user has performed an instruction to start the creation mode, the determination result in step S1 is positive. When the user has performed an instruction to start the play mode, the determination result in step S1 is negative. When the determination result in step S1 is positive, the process in step S2 is executed. When the determination result in step S1 is negative, the process in step S11 (FIG. 19) described below is executed.

In the creation mode, the series of processes in steps S2 to S9 are executed. First, in step S2, the processor 81 (in other words, the object placement means 151) places an object in the game space, based on an instruction of the user. That is, the processor 81 acquires the instruction from the user, and then if the acquired instruction is an instruction to place an object, the processor 81 places the object in accordance with the instruction. At this time, the processor 81 generates a game image (FIG. 9) indicating a game space where the object is placed, and causes the display device to display the game image. Next to step S2, the process in step S3 is executed.

In step S3, the processor 81 (in other words, the count means 152) counts, as for a predetermined type of objects, the placement number of the objects placed in the created game space. The count of the placement number is performed according to the method described in the above "[2-3. Process of setting clear condition]". The processor 81 stores, in the memory, placement number information indicating the placement number for each type of object. Next to step S3, the process in step S4 is executed.

In step S4, the processor 81 acquires an instruction from the user, and determines whether or not an instruction to set a clear condition (i.e., an instruction made by selecting the clear condition icon 218) has been performed by the user. When the determination result in step S4 is positive, the series of processes in steps S5 and S6 are executed. When the determination result in step S4 is negative, the processes in steps S5 and S6 are skipped, and the process in step S7 described below is executed.

In step S5, the processor 81 (in other words, the candidate presentation means 153) presents candidates of the clear condition. That is, the processor 81 determines the candidates of the clear condition, based on the placement number counted in the process of step S3. At this time, the processor 81 stores, in the memory, candidate group information indicating a group that includes one or more candidates determined. Further, the processor 81 displays a clear condition window (FIGS. 10 to 12) representing the determined candidates. The specific display content in the clear condition window is as described in the above "[2-3. Process of setting clear condition]". As described above, while the clear condition window is displayed, the processor 81 acquires an instruction to designate the object change buttons 233 and 234, the increment button 236, and the decrement button 237, and changes the candidates displayed in the clear condition window in accordance with the instruction. Next to step S5, the process in step S6 is executed.

In step S6, the processor 81 (in other words, the clear condition setting means 154) sets the clear condition, based on an instruction of the user. That is, the processor 81 acquires an instruction from the user. When an instruction to designate the condition determination button image 239 has been performed, the processor 81 sets, as the clear condition, a candidate that is displayed at the time of the instruction. Then, the processor 81 stores, in the memory, clear condition information indicating the set clear condition. When a condition value relating to the set clear condition is the maximum value, the processor 81 stores, in the memory, clear condition information including information indicating that the condition value is the maximum value. Further, the processor 81 deletes the clear condition window, and causes the display device to display the game image (FIG. 9) that allows the user to create a game space. Next to step S6, the process in step S7 is executed.

In step S7, the processor 81 determines whether or not the placement number of the target object relating to the set clear condition has been changed through the process in step S2. If no clear condition has been set when the process in step S7 is performed, the determination result in step S7 is negative. When the determination result in step S7 is positive, the process in step S8 is executed. When the determination result in step S7 is negative, the series of processes in steps S8 and S9 are skipped, and the process in step S10 described below is executed.

In step S8, the processor 81 determines whether or not the condition value relating to the set clear condition is the maximum value. The determination in step S8 can be performed with reference to the clear condition information stored in the memory. When the set clear condition is a player condition, since no condition value is set, the determination result in step S8 is negative. When the determination result in step S8 is positive, the process in step S9 is executed. When the determination result in step S8 is negative, the process in step S9 is skipped, and the process in step S10 described below is executed.

In step S9, the processor 81 (in other words, the clear condition setting means 154) resets the clear condition. Specifically, the clear condition is reset according to the method described in the above "(Process of automatically changing clear condition)". At this time, the processor 81 updates the clear condition information stored in the memory so as to indicate the reset clear condition. Next to step S9, the process in step S10 is executed.

In step S10, the processor 81 determines whether or not to end the creation mode. For example, when an instruction to end the creation mode has been made by the user, the processor 81 determines to end the creation mode. When the determination result in step S10 is positive, the process in step S1 is executed again. When the determination result in step S10 is negative, the process in step S2 is executed again. In the exemplary embodiment, the series of processes in steps S2 to S9 in the creation mode are repeated executed until the result of the determination process in step S10 becomes positive.

Meanwhile, in the play mode, the series of processes in steps S11 to S21 shown in FIG. 19 are executed. In the series of processes shown in steps S11 to S21, game processing, which causes the player to play the game in the created game space by using the clear condition set in the creation mode, is executed.

First, in step S11, the processor 81 generates a game space image (see FIG. 15) representing a game space of a stage to be played, and causes the display device to display the game space image. A method of determining a stage to be played is optional. For example, a stage to be played may be determined according to a selection instruction made by the player. Next to step S11, the process in step S12 is executed.

In step S12, the processor 81 controls the motion of each object placed in the game space. Specifically, the processor 81 controls the motion of a player object in the game space, based on an operation instruction made by the player. In addition, the processor 81 controls the motions of objects other than the player object. For example, the processor 81 controls the motions of an enemy object and an item object in accordance with an algorithm defined in the game program in advance. At this time, the processor 81 stores, in the memory, object information relating to each object whose motion has been controlled. Next to step S12, the process in step S13 is executed.

In step S13, the processor 81 determines whether or not the clear condition has been satisfied. This determination can be performed with reference to the object information and the clear condition information stored in the memory. The clear condition information is associated with the stage information relating to the game space during the game play. When the determination result in step S13 is positive, the process in step S14 is executed. When the determination result in step S13 is negative, the process in step S14 is skipped, and the process in step S15 is executed.

In step S14, the processor 81 applies a clear mark to the player object. Specifically, the processor 81 places an object representing the clear mark near the player object in the game space. The clear mark may be displayed by a method of superimposing an image of the clear mark on a game image generated in the process of step S19 described below, instead of the method of displaying the clear mark by placing the object in the game space. Next to step S14, the process in step S15 is executed.

In step S15, the processor 81 determines whether or not the player object has reached the goal position. Specifically, the processor 81 determines whether or not the player object has touched the goal object, based on the object information and the stage information stored in the memory. When the determination result in step S15 is positive, the process in step S16 is executed. When the determination result in step S15 is negative, the series of processes in steps S16 to S18 are skipped, and the process in step S19 described below is executed.

In step S16, the processor 81 determines whether or not the clear condition has been satisfied. The determination in step S16 is performed by the same method as that for the determination in step S13. However, in step S16, if no clear condition has been set for the game space, it is determined that a clear condition has been satisfied, and thus the determination result is positive. When the determination result in step S16 is positive, the process in step S17 is executed. When the determination result in step S16 is negative, the process in step S18 is executed.

In step S17, the processor 81 determines that the game being played has been cleared. Next to step S17, the process in step S19 is executed.

Meanwhile, in step S18, the processor 81 notifies the player that the clear condition has not been satisfied yet. Specifically, the processor 81 places an object representing a message for the notification in the game space. This message may be displayed according to a method of superimposing an image of the message on a game image generated in the process in step S19 described below, instead of the method of displaying the message by placing the object in the game space. Next to step S18, the process in step S19 is executed.

In step S19, the processor 81 generates a game image. Specifically, the processor 81 generates a game space image (FIG. 15) representing a game space by using the stage information and the object information stored in the memory. When it is determined in step S17 that the game has been cleared, the processor 81 generates a game image representing the game clear (e.g., an image in which the player object, which has reached the goal, performs a predetermined action). Next to step S19, the process in step S20 is executed.

In step S20, the processor 81 causes the display device to display the game image generated in step S19. That is, the processor 81 causes the display device to display a game space image representing the state in which the player object moves in the game space. When the processing loop from step S12 to step S21 is repeatedly executed, the process in step S20 is executed every predetermined time period (e.g., every frame period). Next to step S20, the process in step S21 is executed.

In step S21, the processor 81 determines whether or not to end the play mode. For example, when an instruction to end the play mode has been made by the user, the processor 81 determines to end the play mode. When the determination result in step S21 is positive, the process in step S1 is executed again. When the determination result in step S21 is negative, the process in step S12 is executed again. In the exemplary embodiment, the series of processes in steps S12 to S21 in the play mode are repeatedly executed until the result of the determination process in step S21 becomes positive.

Although not shown in the figures, when an end instruction to end the game processing is performed by the user during the game processing shown in FIGS. 18 and 19, the processor 81 ends the game processing shown in FIGS. 18 and 19. The processor 81 may receive the end instruction at any timing during the game processing.

[4. Function and Effect of Exemplary Embodiment, and Modifications]

As described above, the information processing program (i.e., the game program) according to the exemplary embodiment is executed in a computer of the information processing apparatus (i.e., the main body apparatus 2), and causes the computer to function as the following means:
- the object placement means 151 configured to place an object in a virtual space (i.e., a game space);
- the count means 152 configured to count, for at least one type of object, the placement number of the objects placed in the virtual space;
- the candidate presentation means 153 configured to present candidates of a clear condition, which includes a condition relating to the object and is used for determining that a game using the virtual space has been cleared, on the basis of the placement number counted by the count means, in a selectable manner for a user; and the clear condition setting means 154 configured to set a candidate selected by the user, as the clear condition.

According to the above exemplary embodiment, with the above configuration, candidates according to the placement number of the objects placed in the virtual space are presented to the user as the candidates of the clear condition. Thus, the candidates to be presented to the user are changed according to the placement state of the objects in the virtual space, whereby the operation of selecting a candidate is facilitated for the user, and the user can easily set the clear condition.

In the above exemplary embodiment, the candidate presentation means 153 presents, as each of the candidates of the clear condition, a condition (e.g., the component condition) relating to execution of an action (specifically, an action based on an input performed by the player of the game) on a predetermined type of object. In the above exemplary embodiment, the predetermined type of object is an enemy object or an item object. In the above exemplary embodiment, the predetermined type of object may be an object (i.e., the change item object) that acts on the player object and causes the state of the player object to change.

The clear condition in the above exemplary embodiment is a condition relating to a parameter that indicates the number of game events caused by an action on at least one type of object. The "game event caused by execution of an action" is a game event relating to an object to be a target of the action. For example, in the above exemplary embodiment, the "number of game events caused by execution of an action" is the "number of enemy objects defeated (by an action, of the player object, stomping on the enemy objects)" or the "number of coin objects collected (by an action, of the player object, touching the coin objects)".

In the above exemplary embodiment, the case where the number of times the action is executed is equal to the number of game events has been described as an example. However, these numbers need not be equal to each other. That is, in the above exemplary embodiment, the parameter used for determination of the clear condition indicates the number of times the action is executed, and indicates the number of game events. However, in another embodiment, the parameter need not indicate the number of times the action is executed. For example, the exemplary embodiment may be modified as follows.

For example, according to a first modification of the above exemplary embodiment, a plurality of enemy objects can be defeated by one fireball thrown by the player object (in the above exemplary embodiment, only one enemy object can be defeated by one fireball). At this time, the number of times the action (i.e., the action of throwing the fireball) is executed does not necessarily coincide with the number of game events caused by the action (i.e., the number of the defeated enemy objects). In the first modification, determination of the clear condition may be performed by using the parameter indicating the "number of the defeated enemy objects".

For example, in a second modification of the above exemplary embodiment, a special coin object, which is counted as five normal coin objects when being collected by the player object, may be placed. At this time, the number of times the action (i.e., the action of the player object touching the coin object) is executed does not necessarily coincide with the number of game events caused by the action (i.e., the number of the collected coin objects). In the second modification, determination of the clear condition may be performed by using the parameter indicating the "number of the coin objects".

For example, in a third modification of the above exemplary embodiment, the parameter used for determination of the clear condition may indicate an amount corresponding to a game event caused by an action performed on at least one type of object. Specifically, the parameter may indicate a score to be added according to a game event. For example, in a game in which the player object can earn 100 points per object when defeating the first enemy object, and 200 points per object when defeating the second enemy object, a case is considered where three first enemy objects and two second enemy objects are placed in the game space in the creation mode. At this time, the candidate presentation means 153 may present candidates of scores to be clear conditions, based on the placement number counted for each enemy object. Specifically, since the score that the player can earn ranges from 0 point to 700 points in the above case, the candidate presentation means 153 may present candidates within the range from 0 point to 700 points, as candidates of condition values (i.e., scores) to be clear conditions.

As in the above exemplary embodiment and the above modifications, the parameter used for determination of the clear condition may be a parameter that changes for each object according to the action. For example, each of the above parameters, i.e., the parameter indicating the "number of the defeated enemy objects" in the exemplary embodiment and the first modification, the parameter indicating the "number of the collected coin objects" in the exemplary embodiment and the second modification, and the parameter indicating the score in the third modification, is a parameter that changes for each object according to the action.

The "action" may be an action that actually causes a change in the game space, or may be an action that causes no change in the game space. For example, when a clear condition that "block object(s) should be hit ten times" is set, the game system 1 may determine that the clear condition has been satisfied when 10 block objects have been hit and destroyed by the player object. Alternatively, regardless of whether or not block objects have been destroyed, the game system 1 may determine that the clear condition has been satisfied when the player object has hit 10 block objects.

(Modifications Relating to Game in Play Mode)

In the above exemplary embodiment, the case where one player plays the game in the play mode has been described as an example. In another embodiment, a multiplayer game may be performed in the play mode. That is, the game execution means 155 may execute game processing based on instructions of a plurality of players.

When such a multiplayer game is performed, whether or not a clear condition has been satisfied may be independently determined for each player, or may be collectively determined for the players. For example, when a clear condition that "100 or more coin objects should be collected" is set, the game execution means 155 may determine whether or not one player object has collected 100 or more coin objects, or may determine whether or not the number of coin objects collected by the respective player objects is 100 or more. In the above case, the game execution means 155 may determine that the clear condition has been satisfied for a player object that has collected the 100th coin object among the coin objects collected by the respective player objects.

Alternatively, for example, when a clear condition that "a player object should be strengthened by a flower object", the game execution means 155 may determine whether or not each player object has been strengthened, or may determine whether or not all the player objects have been strengthened. In a case where one flower object is placed in the game space in the creation mode, the game execution means 155 may place, in the game space in the play mode, only one flower object or flower objects as many as the number of the player objects.

Figure 20:
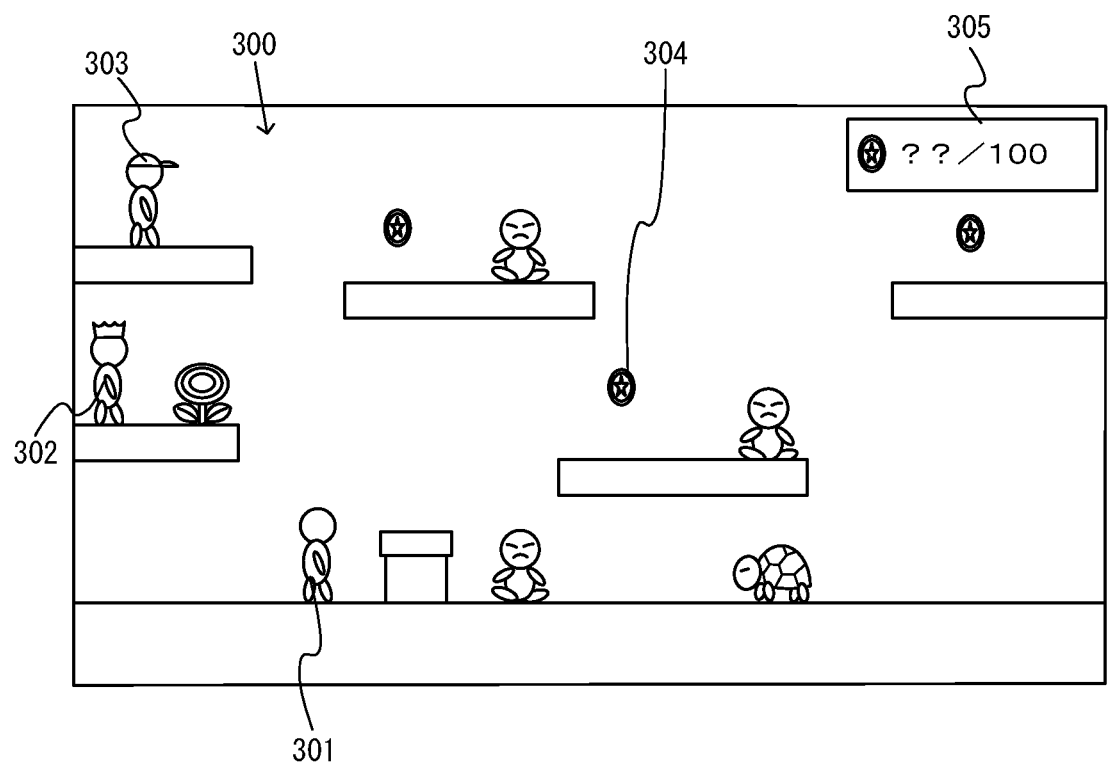
FIG. 20 shows an example of a game image in a multi-player game, according to a modification of an exemplary embodiment.

Hereinafter, a modification in which a multiplayer game is performed in the game system 1 will be described with reference to FIGS. 20 to 24. FIG. 20 shows an example of a game image in the multiplayer game. The game image 300 shown in FIG. 20 is a game image displayed in the play mode. As shown in FIG. 20, in the present modification, three player objects 301 to 303 appear in the game space. In the present modification, three players join the game, and each player operates one player object. In another embodiment, the number of players (in other words, the number of player objects) who join the multiplayer game may be any number equal to or greater than 2.

In the present modification, each player performs the game by using one game system. Each game system communicates with the other game systems, and executes game processing based on an input to an own controller and information received from the other game systems. Specifically, the game system 1 receives, from another game system, information relating to a player object operated by a player using the other game system, and controls the motion of the respective player objects, based on the received information. The information relating to the player object is, for example, information indicating the content of an input performed by the player using the other game system, or information indicating the position and/or the motion of the player object.

In the present modification, the game system 1 causes the display device to display a game space within a display range including a player object corresponding to the game system 1 (i.e., a player object operated by a player who performs an input by using the controller of the game system 1). In the play mode, for example, the game system 1 causes the display range to scroll so as to include the player object corresponding to the game system 1, and causes the display device to display an image representing a part of the game space. In the example shown in FIG. 20, the player object 301 corresponds to the game system 1. At this time, the player objects 302 and 303 corresponding to the other game systems may be outside the display range of the display device of the game system 1, and may not be displayed on the screen.

In the present modification, the multiplayer game is a game in which the respective players play (in other words, compete) with each other. Specifically, in the present modification, a player, who has caused the own player object having satisfied the clear condition to reach the goal, is a winner, while the other players are losers. In another embodiment, the multiplayer game may be of any form, and may be a game in which a plurality of players cooperate with each other (described later in detail).

As described above, in the present modification, the game execution means 155 determines that the game has been cleared when, among a plurality of player objects operated by a plurality of players, respectively, a player object satisfying the clear condition has reached a predetermined goal position in the game space. Thus, the clear condition set by the user can be applied to the multiplayer game.

In the following description, the game processing in the play mode will be described for a case where a clear condition that "100 coin objects should be collected" is set. In the present modification, the game system 1 displays an image representing the clear condition in the play mode. In the example shown in FIG. 20, a clear content image 305 representing the content of the clear condition that "100 coin objects should be collected" is displayed. The clear content image 305 will be described later in detail.

Figure 21:
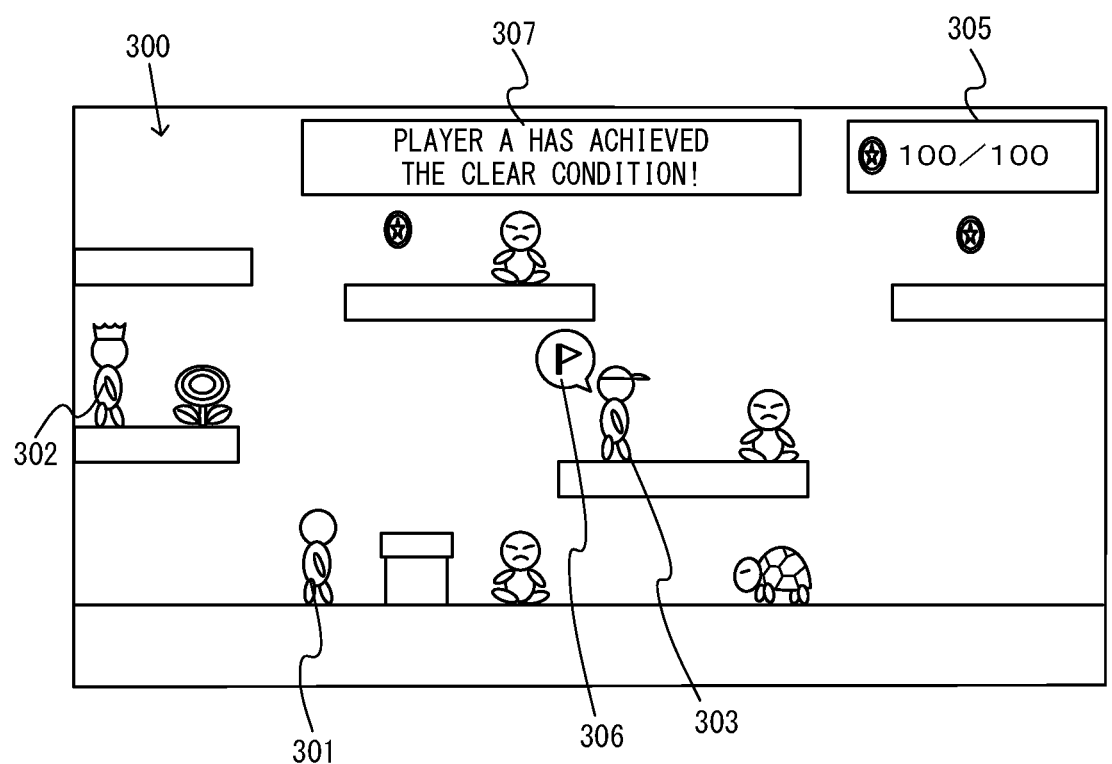
FIG. 21 shows an example of a game image in a state where a clear condition has been satisfied, according to the modification of the exemplary embodiment.

FIG. 21 shows an example of a game image in the state where the clear condition has been satisfied. Specifically, FIG. 21 shows the game image in the state where the player object 303 has collected a coin object 304 shown in FIG. 20 and consequently satisfied the clear condition.

In the present modification, the game system 1 determines that the clear condition has been satisfied for a player object that has collected a coin object with which the total of coin objects collected by the player objects 301 to 303 reaches 100. Therefore, in the present modification, among the plurality of player objects 301 to 303 that appear in the game, the number of player objects that can simultaneously satisfy the clear condition is 1. That is, one player object among the plurality of player objects 301 to 303 can enter the state where the clear condition has been satisfied (hereinafter referred to as "satisfactory state").

As shown in FIG. 21, also in the present modification, when the clear condition has been satisfied, a clear mark 306 is displayed in association with the player object 303 that has satisfied the clear condition (i.e., that has entered the satisfactory state), as in the above exemplary embodiment.

As described above, in the present modification, the game execution means 155 allows some player objects to enter the state where the clear condition has been satisfied, with the number of player objects (1 in this case) less than the number of the plurality of player objects being an upper limit. Then, the game execution means 155 displays the player object in the state where the clear condition has been satisfied, in a manner distinguishable from the state where the clear condition is not satisfied. Specifically, the game execution means 155 displays a predetermined image (i.e., the clear mark 306) in association with the position of the player object in the state where the clear condition has been satisfied. Thus, each player is notified of the fact that the clear condition has been satisfied, and the player object that has satisfied the clear condition, in an easy-to-understand manner.

Any method may be adopted to display the player object in the state where the clear condition has been satisfied in a manner distinguishable from the state where the clear condition is not satisfied. For example, in another embodiment, the game execution means 155 may display the player object in state where the clear condition has been satisfied, so as to be brighter than the player object in the state where the clear condition is not satisfied. Alternatively, for example, the player object in state where the clear condition has been satisfied may be displayed in a color different from that of the player object in the state where the clear condition is not satisfied.

As shown in FIG. 21, in the present modification, when the clear condition has been satisfied, a message 307 notifying that the clear condition has been satisfied is displayed. Specifically, the message 307 includes: information indicating the player (A in this case) operating the player object that has satisfied the clear condition; and notification that the clear condition has been satisfied. The message 307 is displayed regardless of whether or not the player object that has satisfied the clear condition is in the display range in the display device of the game system 1. Thus, even when the player object that has satisfied the clear condition is not present in the display range and therefore the clear mark 306 is not displayed, the player who has achieved the clear condition can be notified to each player in an easy-to-understand manner.

As described above, in the present modification, the game system 1 allows the player object that has performed an action to satisfy the clear condition (i.e., that has collected the 100th coin object) to enter the satisfactory state (in other words, the state having the clear mark 306), and causes the other player objects to remain in the non-satisfactory states. That is, in the present modification, only one player object is in the satisfactory state, that is, a plurality of player objects are not simultaneously in the satisfactory states. Therefore, in the present modification, after a certain player object has satisfied the clear condition and entered the satisfactory state, another player object is allowed to enter the satisfactory state under a predetermined condition (i.e., a player object to be in the satisfactory state is changed to another player object). In this case, since a player, whose player object has merely satisfied the clear condition, may or may not win the game, the interest of the game can be enhanced. Hereinafter, a method of changing a player object to be in the satisfactory state to another player object will be described.

In the present modification, a player object in the non-satisfactory state can enter the satisfactory state by stomping on a player object in the satisfactory state. That is, when the player object in the non-satisfactory state has successfully performed an action of stomping on the player object in the satisfactory state, the game system 1 interchanges the states of these two player objects with each other. Specifically, the player object having been in the non-satisfactory state enters the satisfactory state, and the player object having been in the satisfactory state enters the non-satisfactory state. In this case, the game system applies the clear mark 306 to the player object that has entered the satisfactory state.

As described above, in the present modification, the player object in the non-satisfactory state can take the clear mark 306 from player object in the satisfactory state and enter the satisfactory state by stomping on the player object in the satisfactory state. That is, when a first player object that does not satisfy the clear condition performs a predetermined action on a second player object that has satisfied the clear condition (e.g., an action of stomping on the second player object), the game execution means 155 changes the first player object into the state where the clear condition has been satisfied, and changes the second player object into the state where the clear condition is not satisfied. Thus, the player objects scramble for the right to reach the goal (i.e., the clear mark 306), thereby enhancing the interest of the game.

In another embodiment, when the first player object in the non-satisfactory state performs the predetermined action on the second player object in the satisfactory state, the game execution means 155 may change the first player object into the satisfactory state while causing the second player object to remain in the satisfactory state. Also in this case, the player object in the non-satisfactory state can enter the satisfactory state as in the above modification, thereby enhancing the interest of the game. In this case, the game execution means 155 may or may not set an upper limit on the number of player objects that simultaneously enter the satisfactory states. For example, when the first player object in the non-satisfactory state performs the predetermined action on the second player object in the satisfactory state, the game execution means 155 may cause the second player object to remain in the satisfactory state, on the condition that the number of player objects in the satisfactory states does not exceed the upper limit.

The specific content of the predetermined action is optional. For example, in another embodiment, the predetermined action may be a player object's throwing a fireball to hit another player object with the fireball, or may be a player object's touching another player object.

Figure 22:
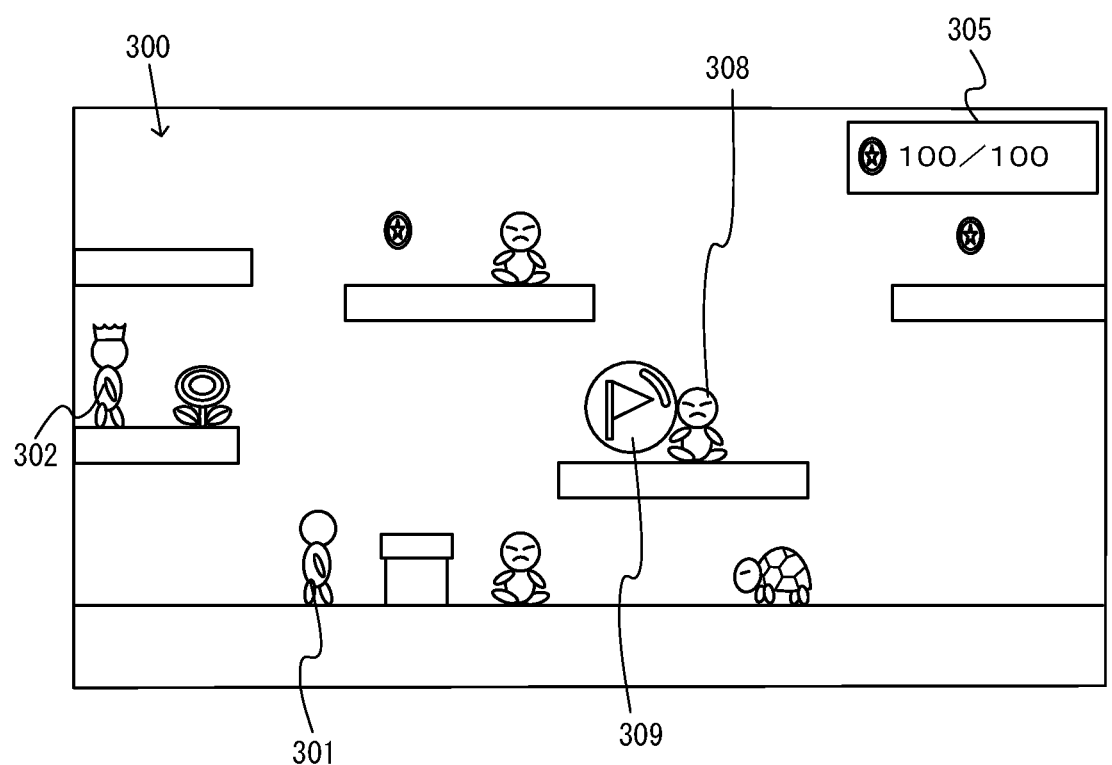
FIG. 22 shows an example of a game image immediately after game over with a player object in a satisfactory state, according to the modification of the exemplary embodiment.

FIG. 22 shows an example of a game image immediately after the game is over for a player object in the satisfactory state. Specifically, FIG. 22 shows the game image in the state where the player object 303, which has been in the satisfactory state in FIG. 21, touches the enemy object 308 to cause game over.

In the present modification, when the game is over for a player object, this player object is placed in a predetermined position in the game space, and the game is resumed from this position. The predetermined position is, for example, a start point, or a predetermined intermediate point between the start point and the goal point. When the game is over for a player object in the satisfactory state, this player object enters the non-satisfactory state and is placed in the predetermined position described above.

As shown in FIG. 22, in the present modification, when the game is over for a player object in the satisfactory state, a clear object 309 is placed in the position where the game is over. The clear object 309 may have any appearance. In the present modification, the clear object 309 has an appearance representing a clear mark.

When a player object obtains the clear object 309, this player object enters the satisfactory state, and the clear mark 306 is applied to the player object. The clear object 309 may be placed in a standstill state in the game space, or may be moved according to a predetermined motion algorithm. In the present modification, the clear object 309 simulates a soap bubble containing the clear mark 306, and for example, moves as if floating in the game space.

As described above, in the present modification, a player object can enter the satisfactory state by obtaining a clear object that is placed in response to game over. Specifically, when a player object in the satisfactory state satisfies a cancellation condition (i.e., when the game is over for this player object), the game execution means 155 causes the clear object 309 to appear in the game space. When a player object that does not satisfy the clear condition obtains the clear object 309, the game execution means 155 changes this player object into the state where the clear condition has been satisfied. Thus, the right to reach the goal (i.e., the clear mark 306) can be moved between the player objects, thereby enhancing the interest of the game.

In the present modification, when a player object in the satisfactory state satisfies the cancellation condition, the game execution means 155 changes this player object into the non-satisfactory state. In another embodiment, in the above case, the game execution means 155 may cause the player object to remain in the satisfactory state. Also in this case, as in the above modification, the player object in the non-satisfactory state can enter the satisfactory state, thereby enhancing the interest of the game. In the above case, the game execution means 155 may or may not set an upper limit on the number of player objects that simultaneously enter the satisfactory states. For example, when the player object in the satisfactory state satisfies the cancellation condition, the game execution means 155 may cause the player object to remain in the satisfactory state, on the condition that the number of player objects in the satisfactory states does not exceed the upper limit.

In the present modification, a player object in the non-satisfactory state, even when a player object in the satisfactory state is not present around it, can enter the satisfactory state by obtaining the clear object 309. Thus, chance for a player object in the non-satisfactory state to enter the satisfactory state can be increased, thereby further enhancing the interest of the game.

In the present modification, the cancellation condition, with which a player object in the satisfactory state enters the non-satisfactory state and the clear object 309 appears, is game over for the player object. However, the cancellation condition is not limited to the above condition. For example, in another embodiment, the cancellation condition may be that a player object in the satisfactory state has changed from the strengthened state to the normal state. Alternatively, the cancellation condition may be that a player object in the non-satisfactory state has stomped on a player object in the satisfactory state (in this case, in response to the player object in the satisfactory state having been stomped, the clear object 309 is placed instead of interchanging the satisfactory state and the non-satisfactory state between the two player objects as in the above modification". When a player object that has satisfied the cancellation condition does not disappear from the game space, the clear object 309 may be placed in a position different from the position where the player object has satisfied the cancellation condition.

As described above, in the present modification, a player object can enter the satisfactory state by stomping on a player object in the satisfactory state or by obtaining the clear object 309. Therefore, in the present modification, after a certain player object has satisfied the clear condition, this player object tries to reach the goal while preventing the clear mark 306 from being taken by other player objects. Meanwhile, other player objects try to take the clear mark 306 from the player object with the clear mark 306 and reach the goal.

The clear object 309 may appear when a condition, other than the cancellation condition, has been satisfied. For example, in a case where a clear condition that "three enemy objects should be defeated" is set, if the third enemy object has disappeared due to a reason other than "being defeated by a player object", the game execution means 155 may place the clear object 309 in the game space. Thus, the clear object 309 may be placed in the game space when an object that is required for satisfying the clear condition has disappeared. Thus, each player object can get a chance to enter the satisfactory state even after the object required for satisfying the clear condition has disappeared. An enemy object disappears, for example, when the enemy object is defeated by another enemy object or when the enemy object falls over a precipice. In the above case, the clear object 309 may appear in any position. For example, the clear object 309 may appear in the position where the enemy object has disappeared.

Figure 23:
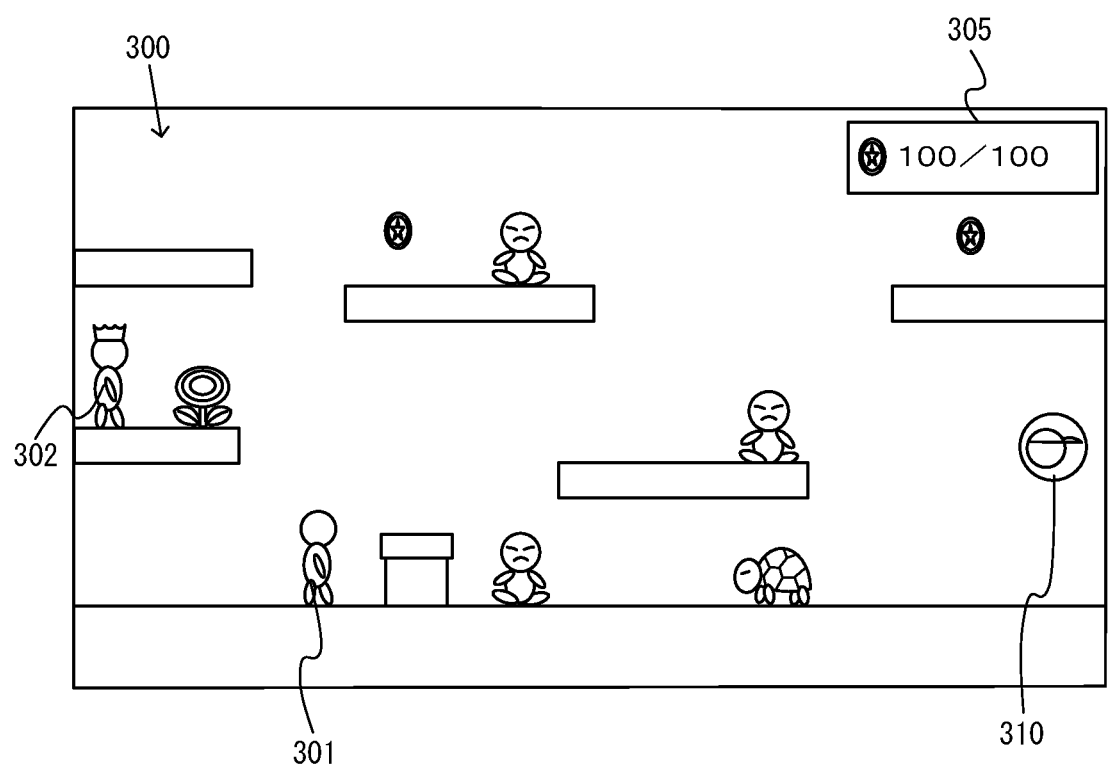
FIG. 23 shows an example of a game image in a state where a player object in a satisfactory state is present outside a display range, according to the modification of the exemplary embodiment.

FIG. 23 shows an example of a game image in a state where a player object in the satisfactory state is present outside a display range. As described above, in the present modification, as for a player object corresponding to another game system different from a certain game system 1, this player object may be outside the display range of the display device of the game system 1 and may not be displayed on the screen.

As shown in FIG. 23, when the player object in the satisfactory state is outside the display range, the game system 1 displays a position mark indicating the position of the player object (in this case, a mark indicating the player object) 310. In the state shown in FIG. 23, the player object in the satisfactory state is present on the right side of display range in the game space. Therefore, the game system 1 displays the position mark 310 near the right end of the display range. Thus, each player can recognize that the player object in the satisfactory state is present in a position on the right side of the player object operated by the player. Although not shown in FIG. 23, when the player object in the satisfactory state is present on the left side of the display range, the position mark 310 is displayed near the left end of the display range. When the player object in the satisfactory state is present on the upper side of the display range, the position mark 310 is displayed near the upper end of the display range. When the player object in the satisfactory state is changed, the display of the position mark 310 is changed according to the change of the player object in the satisfactory state. When the player object in the satisfactory state enters the display range, the position mark 310 is not displayed.

In the present modification, it can be said that the position mark 310 indicates the direction of the player object in the satisfactory state with respect to the position of the display range (in other words, the position of the player object corresponding to the game system 1). Thus, the position mark 310 may roughly indicate the position and/or the direction of the player object in the satisfactory state in the game space. In another embodiment, the position mark 310 may be any image indicating the position and/or the direction of the player object in the satisfactory state in the game space. For example, in another embodiment, the game system 1 may display, as the position mark 310, an image indicating a map of the game space, and the position of the player object in the satisfactory state on the map.

As described above, the game execution means 155 causes the display device to display an image indicating the range of a part, of the game space, which includes its own player object that is operated by the player who performs an input to the game system 1 (see FIGS. 20 to 23). In a case where another player object different from the own player object, among the plurality of player objects, has satisfied the clear condition and is present outside the range displayed on the display device, the game execution means 155 causes the display device to display an image (i.e., the position mark 310) indicating the position and/or the direction of the other player object (see FIG. 23). Thus, the player who operates the player object in the non-satisfactory state can know the position (or the rough position) of the player object in the satisfactory state which is an objective for the player, and can easily move the own player object toward the player object in the satisfactory state.

In the present modification, when the clear object 309 is placed in the game space, the game system 1 displays a position mark (not shown) indicating the position of the clear object 309. For example, the position mark may be a mark indicating the clear object 309. Thus, the player who operates the player object in the non-satisfactory state can know the position of the clear object 309 which is an objective for the player, and can easily move the own player object toward the clear object 309.

In the present modification, one stage may be divided into a plurality areas. For example, a player object, which has entered the pipe object, can move from an area where the pipe object is placed to another area. Thus, in the case where one stage is composed of a plurality of areas, if a player object in the satisfactory state (or the clear object 309) is present in an area different from the area where the own player object is present, the game system 1 does not display the position mark. In this case, the player who operates the player object in the non-satisfactory state can know that the player object in the satisfactory state (or the clear object 309), which is an objective for the player, is present in the area different from the area where the own player object is present.

In another embodiment, in the state where the player object in the satisfactory state (or the clear object 309) is present in the area different from the area where the own player object is present, the game system 1 may display a position mark. For example, the game system 1 may display a position mark indicating: a map showing the entire stage; and the position of the player object in the satisfactory state on the map. For example, in the case where the stage is composed of a plurality of areas, if the route from a start point to a goal point is one, the game system 1 may display a position mark indicating whether the player object in the satisfactory state is present ahead of the own player object (i.e., on the side where the goal point is present) or behind the own player object (i.e., on the side where the start point is present).

As shown in FIGS. 20 to 23, in the present modification, the clear content image 305 indicating the content of the clear condition is displayed. In the examples shown in FIGS. 20 to 23, since the clear condition that "100 coin objects should be collected" is set, the clear content image 305 includes an image representing a coin object and an image representing the condition value (100 in this case) of the clear condition.

In the state where none of the player objects have achieved the clear condition, the clear content image 305 representing "??/100" is displayed as shown in FIG. 20. This clear content image 305 indicates the clear condition such that each player cannot recognize the current number of collected coin objects with respect to the number (100 in this case) of coin objects required for achieving the clear condition. In the present modification, a player object that has collected the 100th coin object can enter the satisfactory state. Therefore, if each player can recognize the current number of collected coin objects, it is considered that some player may play the game by an unfair playing method such that the player adjusts a coin object he/she will collect next to be the 100th coin object (e.g., a playing method such that the player object stands by in front of a coin object until the current number of collected coin objects reaches 99). If each player performs such an unfair playing method, the interest of the competitive game may be degraded. Therefore, in the present modification, for the purpose of avoiding such a playing method, the clear content image 305 is displayed such that each player cannot recognize the current number of collected coin objects.

As described above, in the present modification, the clear condition is a condition relating to a parameter indicating the "number of game events" or the "amount corresponding to the game events" (in the above example, a parameter indicating the number of collected coin objects). This parameter indicates the total of the numbers of game events relating to a plurality of player objects or the total of the amounts corresponding to the game events. That is, the number of collected coin objects is counted commonly for the plurality of player objects. The game execution means 155 causes a player object that has performed an action by which the parameter has satisfied the clear condition (in the above example, a player object that has collected the 100th coin object) to enter the state where the clear condition has been satisfied. The player objects other than this player object do not enter the state where the clear condition has been satisfied. At this time, the game execution means 155 presents the number or amount required for satisfying the clear condition, and does not present the current value of the parameter (FIG. 23). Thus, each player is prevented from playing the game by the playing method that degrades the interest of the competitive game.

As an example of the multiplayer game according to the present modification, the case where a component condition as described above is set as a clear condition has been described above. Next, a case where a player condition as described above is set as a clear condition will be described.

In the present modification, in the case where the player condition is set as a clear condition, all the plurality of player objects can simultaneously satisfy the clear condition. For example, when one flower object is placed in the game space in the creation mode, the game system 1 places flower objects as many as the number of the player objects that appear in the game space. In this case, the game system 1 may place one flower object apparently in the game image, and may cause the flower object to disappear only when the flower object is obtained by a number of times as many as the number of player objects that appear in the game space.

As described above, when the player condition is set as a clear condition, all the player objects can simultaneously enter the satisfactory states. Therefore, when the player condition is set, in contrast to the case of setting the component condition, a process of changing the player object in the satisfactory state to another player object is not executed. That is, a player object in the non-satisfactory state cannot enter the satisfactory state even when the player object stomps on a player object in the satisfactory state. In addition, no clear object 309 is placed even when the game is over for the player object in the satisfactory state.

When the player condition is set as a clear condition, as in the case of setting the component condition, a clear mark is applied to a player object that has satisfied the clear condition. However, in the present modification, the game system 1 applies, to the player object that has satisfied the player condition, a clear mark that is different in appearance from the clear mark applied to the player object that has satisfied the component condition. For example, the game system 1 may differentiate a pattern drawn on a flag as the clear mark, between the player condition and the component condition. Thus, each player can easily recognize whether the clear condition satisfied by the player object is the component condition or the player condition (in other words, whether the player can take the clear mark applied to the player object in the satisfactory state).

Figure 24:
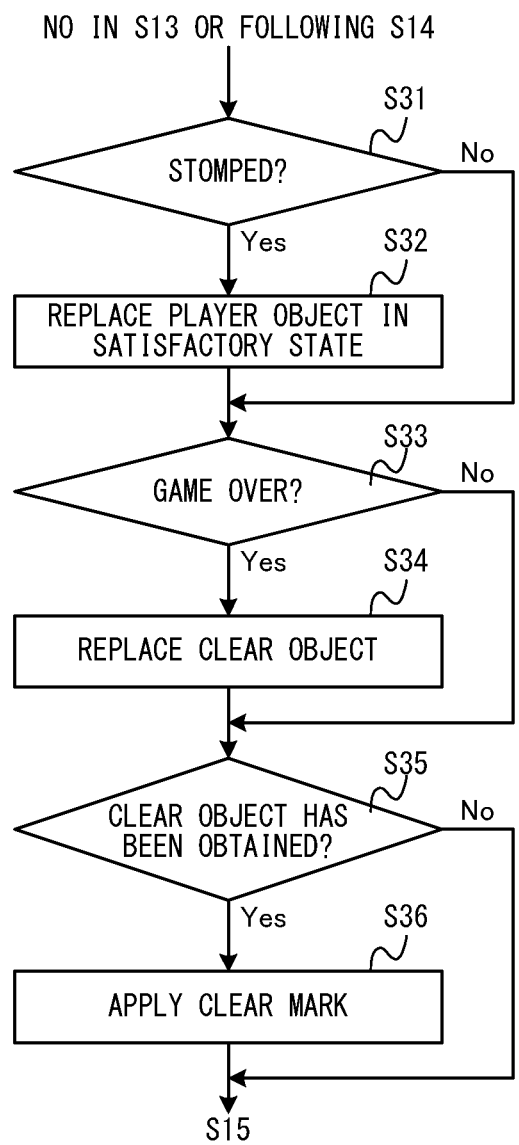
FIG. 24 is a flowchart showing an example of a flow of game processing according to the modification of the exemplary embodiment.

Next, a specific example of information processing to be executed by the game system 1 according to the present modification will be described with reference to FIG. 24. Also in the present modification, as in the above exemplary embodiment, a series of steps of game processing as shown in FIGS. 18 and 19 are executed. In the present modification, a series of steps shown in FIG. 24 are further executed. The series of steps shown in FIG. 24 are, like the series of steps shown in FIG. 19, executed by the processor 81 which functions as game processing means 155.

FIG. 24 is a flowchart showing an example of a flow of game processing according to the present modification. As shown in FIG. 24, in the present modification, the process in step S31 is executed next to step S14 in FIG. 19, or when the determination result in step S13 shown in FIG. 19 is negative.

In step S31, the processor 81 determines whether or not a player object in the non-satisfactory state has stomped on a player object in the satisfactory state. This determination is performed based on the result of control performed on the motion of each player object in step S12. When the determination result in step S31 is positive, the process in step S32 is executed. When the determination result in step S31 is negative, the process in step S32 is skipped, and the process in step S33 described below is executed.

In step S32, the processor 81 changes the player object in the satisfactory state. That is, the player object that has stomped on the player object in the satisfactory state newly enters the satisfactory state while the player object having been in the satisfactory state enters the non-satisfactory state. In the present modification, the aforementioned object information (see FIG. 17) includes information as to whether each player object is in the satisfactory state or in the non-satisfactory state. In step S32, the processor 81 updates the object information so as to indicate the states of the player objects after the interchange. Next to step S32, the process in step S33 is executed.

In step S33, the processor 81 determines whether or not the game is over for the player object in the satisfactory state. This determination is performed based on the result of control performed on the motion of each player object in step S12. For example, when the player object has touched an enemy object or has fallen over a precipice, the processor 81 determines that the game is over for the player object. When the determination result in step S33 is positive, the process in step S34 is executed. When the determination result in step S33 is negative, the process in step S34 is skipped, and the process in step S35 is executed.

In step S34, the processor 81 places the aforementioned clear object 309 in the position where the game is over for the player object in the satisfactory state. In the state where the clear object 309 is placed in the game space, the motion of the clear object 309 is controlled in step S12. The processor 81 updates the object information so as to indicate that the player object for which the game is over is in the non-satisfactory state. Next to step S34, the process in step S35 is executed.

In the present modification, the processor 81 executes the series of processes in steps S31 to S34 when the clear condition is the component condition, and does not execute the series of processes in steps S31 to S34 when the clear condition is the player condition. Therefore, in the case where the clear condition is the player condition, the process in step S35 is executed next to step S14 in FIG. 19, or when the determination result in step S13 shown in FIG. 19 is negative.

In step S35, the processor 81 determines whether or not the clear object 309 has been obtained by a player object. This determination is performed based on the result of control performed on the motion of each player object in step S12. For example, when a player object has touched the clear object 309, the processor 81 determines that the clear object 309 has been obtained by the player object. When the determination result in step S35 is positive, the process in step S36 is executed. When the determination result in step S35 is negative, the process in step S36 is skipped, and the process in step S15 (see FIG. 19) is executed.

In step S36, the processor 81 applies a clear mark to the player object that has obtained the clear object 309. The method of applying the clear mark to the player object is the same as that in step S14 described above. In addition, the processor 81 updates the object information so as to indicate that the player object that has obtained the clear object 309 is in the satisfactory state. Next to step S36, the process in step S15 is executed.

In the present modification, in the aforementioned game processing, the determination processes in steps S15 and S16 are performed on each of the player objects. Therefore, in the present modification, the processor 81 determines that the game is over when the player object in the satisfactory state has reached the goal position.

In the present modification, in step S19, the processor 81 generates an image in which the clear content image 305 is superimposed on the game space image (FIG. 20). When the player object in the satisfactory state or the clear object 309 is outside the display range, the processor 81 generates an image in which the position mark 310 is superimposed on the game space image (FIG. 20). Thus, in the present modification, the clear content image 305 is displayed, and the position mark 310 is displayed according to need.

In the above modification, the game processing means 155 may execute game processing based on instructions of a plurality of players by using a game space created by any method and a clear condition set by any method. In this case, the game system 1 may create a game space and set a clear condition by any method different from the methods of the above exemplary embodiment. For example, the game system 1 may create a game space and set a clear condition by using any user interface different from the user interface shown in FIGS. 9 to 13. The game system 1 may create a game space and set a clear condition without depending on an instruction of the user. For example, the game system 1 may execute game processing in the play mode by using a game space and a clear condition which have been prepared in advance.

In the above modification, as for a component condition that is a kind of a clear condition, the component condition is set such that some (specifically, one) of a plurality of player objects that appear in the game space can satisfy the clear condition. That is, the clear condition is a condition such that the number of player objects that can simultaneously satisfy the clear condition is less than the total number of the player objects that appear in the game space. That is, when the clear condition is the component condition, the game execution means 155 allows, among the plurality of player objects, some player objects (one player object in this case) less than the number of the plurality of player objects to satisfy the clear condition. In another embodiment, also when the clear condition is the player condition, the game execution means 155 may allow some of the plurality of player objects that appear in the game space to satisfy the clear condition, as in the case where the clear condition is the component condition.

For example, in a case where a player condition that "a player object should reach the goal in the strengthened state with the flower object" is set as a clear condition, when three player objects appear in the game space, the game system 1 may place only two flower objects in the game space. Thus, only some of the plurality of player objects can simultaneously enter the satisfactory states. Also in the case of setting the player condition, as in the case of setting the component condition in the above modification, the game system 1 may change the player object in the satisfactory state under a predetermined condition.

In the above modification, the case where the multiplayer game, in which the respective players compete with each other, is performed has been described as an example. In another embodiment, the multiplayer game may be a game in which the respective players cooperate with each other. That is, when a predetermined number of player objects (one player object or all the player objects) that have satisfied the clear condition reach the goal, the game may be cleared for each of the player objects. In the case of the cooperative game, the game system 1 may allow a player object in the satisfactory state to be changeable, or may allow a player object in the satisfactory state to be unchangeable. In the cooperative game, since each player need not perform the unfair playing method as described above, the game system 1 may display, as a clear content image, an image representing the number of coin objects required for achieving the clear condition and the current number of collected coin objects. In addition, in the cooperative game, the position where the player object, that has caused game over, is placed again may be selected by the corresponding player. For example, the player may select the position where the player object is placed again from among the start point, the intermediate point, and the positions of the other player objects.

The above exemplary embodiment is applicable to, for example, a game system and/or a game program for the purpose of allowing a user to easily set a clear condition.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer readable storage medium having stored therein instructions executable by a computer processor of an information processing apparatus, the instructions, when executed, causing the computer processor to perform operations comprising:
    enabling placement of a plurality of objects in a virtual space of a game being designed by a user using a game stage design tool, each object having an object type associated therewith, wherein objects of a plurality of object types are placeable within the virtual space;
    determining, for at least one said object type, a respective placement number corresponding to a number of the objects placed using the game stage design tool having that respective object type;
    presenting, to the user, a user interface in the game stage design tool, the user interface enabling the user to define a clear condition for the game being designed using the game stage design tool, the user interface being automatically custom-generated to include a plurality of user-selectable clear condition candidates, each user-selectable clear condition candidate relating to one of the object types placeable in the virtual space and being likely to be used in the definition of the clear condition, the plurality of user-selectable clear condition candidates being selected for inclusion in the user interface based on the respective placement number(s); and
    defining the clear condition in connection with one or more user-selected clear condition candidates,
    wherein each of the presented clear condition candidates has associated therewith a parameter indicating a game state achievable in connection with the related object type, the parameter being variable for different object types.

2. The non-transitory computer readable storage medium according to claim 1, wherein:
    condition values for the parameters of the clear condition candidates are settable within a range from equal to or greater than a predetermined value to equal to or smaller than the respective placement number, and
    the clear condition is defined using one or more set condition values.

3. The non-transitory computer readable storage medium according to claim 1, wherein:
    condition value boundaries for the parameters of the clear condition candidates are settable within a range from equal to or greater than a predetermined value to equal to or smaller than the respective placement number, the condition value boundaries being settable to have respective upper- and/or lower-limit values, and
    the clear condition is defined using one or more set condition value boundaries.

4. The non-transitory computer readable storage medium according to claim 1, wherein:
    the user interface enables the user to separately specify an object type for the clear condition, and a condition value therefor, and
    a candidate group consisting of a plurality of the clear condition candidates having different condition values is changed in accordance with the object type selected by the user.

5. The non-transitory computer readable storage medium according to claim 1, wherein a candidate that is firstly presented among the clear condition candidates has the parameter associated therewith set at the respective placement number.

6. The non-transitory computer readable storage medium according to claim 1, wherein in a case where the clear condition is set in connection with a given clear condition candidate having its respective parameter set to the respective placement number and the respective placement number is changed after the clear condition is set, the clear condition is re-set in connection with given clear condition candidate having its respective parameter re-set to the changed placement number.

7. The non-transitory computer readable storage medium according to claim 1, wherein the computer processor is caused to perform further operations comprising:
    placing, in the virtual space, a specific object that causes an object of the object type to appear in the virtual space during game play, and
    correcting the counted placement number in accordance with the number of the specific objects placed in the virtual space.

8. The non-transitory computer readable storage medium according to claim 1, wherein the parameter for at least one of the clear condition candidates relates to a number of the game events, the game events being defeat of enemy objects.

9. The non-transitory computer readable storage medium according to claim 1, wherein the parameter for at least one of the clear condition candidates relates to a number of the game events, the game events being collection of item objects.

10. The non-transitory computer readable storage medium according to claim 1, wherein at least one of the clear condition candidates relates to a state of a player object operable by a player of the game, the state of the player object being changeable in connection with a placeable object.

11. The non-transitory computer readable storage medium according to claim 1, wherein the game is playable by a player in a game play instance using the defined clear condition.

12. The non-transitory computer readable storage medium according to claim 11, wherein a determination is made that the game being played in the game play instance has been cleared, in response to a player object, operated by the player, reaching a predetermined goal position in the virtual space, with the defined clear condition having been satisfied.

13. The non-transitory computer readable storage medium according to claim 11, wherein the player is notified when the defined clear condition has been satisfied when the game is being played in the game play instance.

14. The non-transitory computer readable storage medium according to claim 13, wherein an image is displayed indicating that the defined clear condition has been satisfied, in association with the position of the player object operated by the player.

15. The non-transitory computer readable storage medium according to claim 1, wherein the game is playable in a game play instance using the defined clear condition and based on instructions made by a plurality of players.

16. The non-transitory computer readable storage medium according to claim 15, wherein:
the players operate different respective player objects in the game play instance, and
a determination that the game being played in the game play instance has been cleared is made in response to one of the player objects reaching a predetermined goal position in the virtual space, with the defined clear condition having been satisfied by that player object.

17. The non-transitory computer readable storage medium according to claim 16, wherein:
some of the plurality of player objects are allowed to be deemed to have satisfied the defined clear condition, and
the player objects that have satisfied the defined clear condition are displayable in a manner distinguishable from those that have not.

18. The non-transitory computer readable storage medium according to claim 17, wherein when the game is being played in the game play instance and a first player object that has not satisfied the defined clear condition performs a predetermined action on a second player object that has satisfied the defined clear condition, the first player object is deemed to have satisfied the defined clear condition.

19. The non-transitory computer readable storage medium according to claim 17, wherein:
when one of the player objects that has satisfied the defined clear condition satisfies a cancellation condition, a predetermined clear object is caused to appear in the virtual space of the game being played in the game play instance, and
when one of the player objects that has not satisfied the defined clear condition obtains the clear object, that player object is deemed to have satisfied the defined clear condition.

20. The non-transitory computer readable storage medium according to claim 17, wherein when the game is being played in the game play instance:
a display device is caused to display an image indicating a portion of the virtual space that includes the player object operated by the player who performs input to the information processing apparatus, and
in a case where another player object different from the player who performs the input to the information processing apparatus has satisfied the defined clear condition and is present outside of the portion displayed in the display device, the display device is caused to display an image indicating the position and/or direction of the another player object.

21. The non-transitory computer readable storage medium according to claim 17, wherein:
the defined clear condition relates to a total number of game events caused by an action executed in connection with one of the object types based on player input, or a total amount corresponding to the game events,
a given player object, which has performed the action in the game play instance that causes the defined clear condition to be satisfied, is caused deemed to have satisfied the clear condition, and
a number or an amount required for satisfying the clear condition is caused for display in the game play instance, and a current value is not.

22. The non-transitory computer readable storage medium according to claim 1, wherein the user-selectable clear condition candidates are deemed likely to be used in the definition of the clear condition, provided that objects of the respective related object types are placed in the virtual space.

23. The non-transitory computer readable storage medium according to claim 1, wherein the user-selectable clear condition candidates are deemed likely to be used in the definition of the clear condition, based on a number of objects of the respective related object types placed in the virtual space.

24. The non-transitory computer readable storage medium according to claim 1, wherein the user-selectable clear condition candidates are deemed likely to be used in the definition of the clear condition, based on whether a predetermined number of objects of the respective related object types have been placed in the virtual space.

25. The non-transitory computer readable storage medium according to claim 1, wherein achievable game states include a game event being accomplished a predetermined number of times and/or a state of an in-game object.

26. The non-transitory computer readable storage medium according to claim 1, wherein achievable game states include collection of a predetermined number of coins, defeating a predetermined number of enemy characters, and/or reaching a goal in a strengthened state.

27. An information processing apparatus comprising:
at least a computer processor and a memory, the computer processor being configured to execute instructions to perform functionality comprising:
enabling placement of a plurality of objects in a virtual space of a game being designed by a user using a game stage design tool, each object having an object type associated therewith, wherein objects of a plurality of object types are placeable within the virtual space,
determining, for at least one said object type, a respective placement number corresponding to a number of the objects placed using the game stage design tool having that respective object type,
presenting, to the user, a user interface in the game stage design tool, the user interface enabling the user to define of a clear condition for the game being designed using the game stage design tool, the user interface being automatically custom-generated to include a plurality of user-selectable clear condition candidates, each user-selectable clear condition candidate relating to one of the object types placeable in the virtual space and being likely to be used in the definition of the clear condition, the plurality of user-selectable clear condition candidates being selected for inclusion in the user interface based on the respective placement number(s), and
defining the clear condition in connection with one or more user-selected clear condition candidates,
wherein each of the presented clear condition candidates has associated therewith a parameter indicating a game state achievable in connection with the related object type, the parameter being variable for different object types.

28. An information processing system comprising:

at least a computer processor and a memory, the computer processor being configured to execute instructions to perform functionality comprising:

enabling placement of a plurality of objects in a virtual space of a game being designed by a user using a game stage design tool, each object having an object type associated therewith, wherein objects of a plurality of object types are placeable within the virtual space, determining, for at least one said object type, a respective placement number corresponding to a number of the objects placed using the game stage design tool having that respective object type, presenting, to the user, a user interface in the game stage design tool, the user interface enabling the user to define a clear condition for the game being designed using the game stage design tool, the user interface being automatically custom-generated to include a plurality of user-selectable clear condition candidates, each user-selectable clear condition candidate relating to one of the object types placeable in the virtual space and being likely to be used in the definition of the clear condition, the plurality of user-selectable clear condition candidates being selected for inclusion in the user interface based on the respective placement number(s), and defining the clear condition in connection with one or more user-selected clear condition candidates, wherein each of the presented clear condition candidates has associated therewith a parameter indicating a game state achievable in connection with the related object type, the parameter being variable for different object types.

29. An information processing method to be executed in an information processing system, the method comprising:

enabling placement of a plurality of objects in a virtual space of a game being designed by a user using a game stage design tool, each object having an object type associated therewith, wherein objects of a plurality of object types are placeable within the virtual space, determining, for at least one said object type, a respective placement number corresponding to a number of the objects placed using the game stage design tool having that respective object type, presenting, to the user, a user interface in the game stage design tool, the user interface enabling the user to define a clear condition for the game being designed using the game stage design tool, the user interface being automatically custom-generated to include a plurality of user-selectable clear condition candidates, each user-selectable clear condition candidate relating to one of the object types placeable in the virtual space and being likely to be used in the definition of the clear condition, the plurality of user-selectable clear condition candidates being selected for inclusion in the user interface based on the respective placement number(s), and defining the clear condition in connection with one or more user-selected clear condition candidates, wherein each of the presented clear condition candidates has associated therewith a parameter indicating a game state achievable in connection with the related object type, the parameter being variable for different object types.

* * * * *